(12) United States Patent
Tarokh et al.

(10) Patent No.: US 7,099,698 B2
(45) Date of Patent: Aug. 29, 2006

(54) COMPLEMENTARY BEAMFORMING METHODS AND APPARATUSES

(75) Inventors: Vahid Tarokh, Cambridge, MA (US); Yang-Seok Choi, Liberty Lake, WA (US); Siavash Alamouti, Spokane, WA (US)

(73) Assignee: Vivato, Inc., Spokane, WA (US)

( * ) Notice: Subject to any disclaimer, the term of this patent is extended or adjusted under 35 U.S.C. 154(b) by 271 days.

(21) Appl. No.: 10/700,991

(22) Filed: Nov. 3, 2003

(65) Prior Publication Data

US 2004/0235529 A1 Nov. 25, 2004

Related U.S. Application Data

(60) Provisional application No. 60/423,703, filed on Nov. 4, 2002.

(51) Int. Cl.
*H04M 1/00* (2006.01)

(52) U.S. Cl. .................... 455/562.1; 455/63.4; 455/25; 455/575.7

(58) Field of Classification Search ............. 455/562.1, 455/63.4, 575.7, 25
See application file for complete search history.

(56) References Cited

U.S. PATENT DOCUMENTS

| 6,393,303 B1 * | 5/2002 | Katz ........................ 455/562.1 |
| 6,735,445 B1 * | 5/2004 | Sharony et al. ............. 455/517 |
| 6,839,573 B1 * | 1/2005 | Youssefmir et al. ...... 455/562.1 |
| 2002/0181492 A1 | 12/2002 | Kasami et al. |

* cited by examiner

*Primary Examiner*—Sonny Trinh
*Assistant Examiner*—Dung Lam
(74) *Attorney, Agent, or Firm*—Lee & Hayes, PLLC

(57) ABSTRACT

Improved methods and apparatuses are provided to address a potential "hidden beam problem" in wireless communication systems employing smart antennas. The improved methods and apparatuses utilize complementary beamforming (CBF) techniques, such as, for example, Subspace Complementary Beamforming (SCBF), Complementary Superposition Beamforming (CSBF) and/or Single Beam Complementary Beamforming (SBCBF) techniques.

56 Claims, 29 Drawing Sheets

COMPLEMENTARY BEAMFORMING METHODS AND APPARATUSES

RELATED PATENT APPLICATIONS

This U.S. Patent Application claims the benefit of priority from, and hereby incorporates by reference the entire disclosure of, co-pending U.S. Provisional Application for Letters Patent Ser. No. 60/423,703, filed Nov. 4, 2002, and titled "Complementary Beamforming Techniques".

TECHNICAL FIELD

This invention relates to wireless communications and more particularly to complementary beamforming methods and apparatuses that can be used in wireless data packet communications systems and other like communication systems.

BACKGROUND

Wireless communication systems continue to change the world that we live in. Wireless telecommunication technology, such as, for example, applied in cellular telephony has created an entirely new mobile communicating society in which people are able to stay in contact regardless of their location, especially in the further case of satellite mobile telephones. Wireless communication systems are also changing the way in which people use their computers and other like devices. Here, for example, wireless local area networks can be configured to allow computer users to become mobile and capable of roaming about a coverage area(s) while their computers remain operatively connected to other devices.

In the field of wireless technology there is a continuing desire to increase the effectiveness of the wireless communication system. This desire may lead to lower cost devices, faster communication, increased bandwidth, increases in the size of coverage area(s), etc. One recent improvement to wireless communication systems includes the use of smart antennas. Smart antennas, for example, can be employed in base stations or other like nodes to selectively form directed beams of radiated energy in the direction of another device/node. The smart antennas may also be used to more effectively receive the signals that are transmitted back to it from these and other devices/nodes. These types of smart antenna arrangements within wireless communication systems have proven to be more effective than traditional omni directional antenna arrangements and/or other types of non-smart antenna arrangements in certain environments. U.S. Pat. No. 6,611,231 discloses some exemplary smart antenna systems.

One of the challenges facing wireless communication system designers attempting to use smart antennas is that within an overall supported coverage area there may be multiple devices/nodes supported by a base station and one or more of these devices/nodes may not be able to determine when/if the base station is busy with another device/node due to the selectively reduced coverage area of the transmitted beam(s) from the base station's smart antenna. This type of situation is explained in further examples in the Detailed Description that follows, wherein it is referred to as the "hidden beam problem".

Consequently, there is a need for methods and apparatuses for addressing the hidden beam problem.

SUMMARY

In order to reduce the "hidden beam problem" in smart antenna applications, complementary beamforming (CBF) techniques may be employed. In accordance with certain exemplary implementations of the present invention, "Subspace Complementary Beamforming"(SCBF), "Complementary Superposition Beamforming"(CSBF) and single beam CBF techniques are provided.

These exemplary techniques help satisfy needs for improved methods and apparatuses for solving hidden beam problems and/or other like problems that can affect wireless communications.

BRIEF DESCRIPTION OF THE DRAWINGS

A more complete understanding of the various methods, apparatuses and systems of the present invention may be had by reference to the following detailed description when taken in conjunction with the accompanying drawings wherein.

DESCRIPTION

Overview

This description includes six numbered sections. Section 1 provides an introduction to some exemplary wireless communication systems and the "hidden beam" problem that can significantly reduce the effectiveness of these wireless communication systems. Section 2 describes an exemplary complementary beamforming technique for use with single beam systems. Section 3 describes the hidden beam problem in more detail and introduces further complementary beamforming techniques that may be applied in such wireless communication systems and other like environments. Section 4 introduces a multiple beam uplink and downlink model. Section 5 describes exemplary subspace complementary beamforming techniques that may be applied in wireless communication systems and other like environments having multiple downlink beams to combat hidden beam problems. Section 6 describes some exemplary complementary superposition beamforming techniques that may be applied in such wireless communication systems and other like environments to address the hidden beam problem.

Section 1: Introduction 1.1 Conventional Wireless Communication Systems

Figure 1:
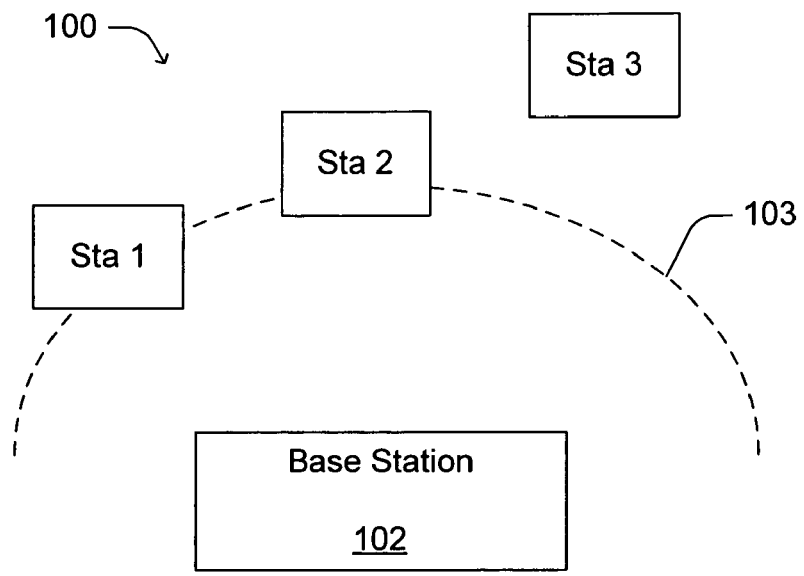
FIG. 1 is an illustrative diagram depicting a conventional wireless communication system having a base station with an omnidirectional antenna.

FIG. 1 depicts an exemplary conventional wireless communication system 100 having a base station 102 that is configured to transmit and receive signals using an omnidirectional antenna (not shown). Base station 102 in this example has a coverage area that extends outward to dashed line 103. Wireless communication system 100 also includes three user stations, shown as, Sta 1, Sta 2 and Sta 3. As illustrated, however, only Sta 1 and Sta 2 are within the coverage area of base station 102. This means that Sta 1 and Sta 2 can each uplink communicate to base station 102 and receive downlink communication from base station 102. Sta 103, being outside of the coverage area cannot receive downlink communications from base station 102.

One popular form of wireless communication system 100 is an IEEE 802.11 based wireless local area network (WLAN), wherein Sta 1 and Sta 2 are applicably configured computers or other like devices. For example, IEEE 802.11a and IEEE 802.11b are currently popular forms of WLANs. The transmit power levels in such wireless communication systems are typically limited by government regulations. As such, Sta 3 can fall outside of the coverage area of the WLAN.

IEEE 802.11 WLANs are based on a Carrier Sense Multiple Access (CSMA) operation in which a each station transmits only when it determines that no other station is currently transmitting. This tends to avoid collisions that occur when two or more stations transmit at the same time. Collisions usually require that the transmitted packets be retransmitted.

1.2 Smart Antenna Wireless Communication Systems

Figure 2:
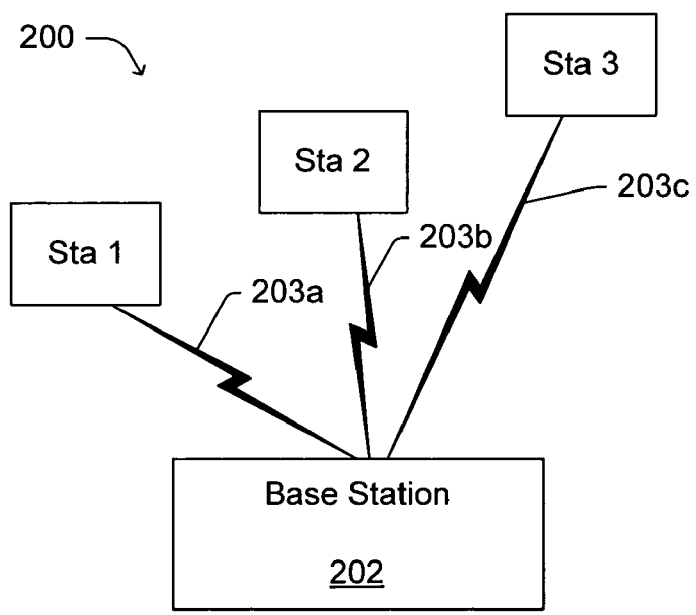
FIG. 2 is an illustrative diagram depicting a wireless communication system having an improved base station with a smart directional antenna, in accordance with certain exemplary implementations of the present invention.

FIG. 2 depicts a wireless communication system 200 having an improved base station 202 that is capable of communicating with all three user stations, namely, Sta 1, Sta 2 and Sta 3. Base station 202, in this example, uses at least one smart antenna (not shown) for at least the downlink transmissions. A smart antenna is one that provides a selectively-directed beamforming capability. For example, a smart antenna may include a phased array antenna or the like.

The smart antenna allows for the (government regulated) limited power of base station 202 to be substantially concentrated in at least one direction or beam. Thus, for example, base station 202 may transmit a beam 203a to Sta 1, a beam 203b to Sta 2, and/or a beam 203c to Sta 3. Even without the additional transmission power, base station 202 has an increased coverage area by focusing the transmit energy to particular direction instead of radiating omnidirectionally and is therefore able to service Sta 3. Note that one or more beams 203a–c may simultaneously be transmitted in certain implementations.

However, if wireless communication system 200 is an IEEE 802.11 based WLAN or some other CSMA or like system, then there is a chance for increased transmission collisions since base station 202 transmits directed beams that may be undetected by one or more of the user stations. Thus, for example, while base station 202 is transmitting downlink beam 203a to Sta 1, Sta 3 may decide to uplink transmit at the same time since it cannot detect the existing directed beam traffic. This is an example of the hidden beam problem that is addressed herein.

Figure 3:
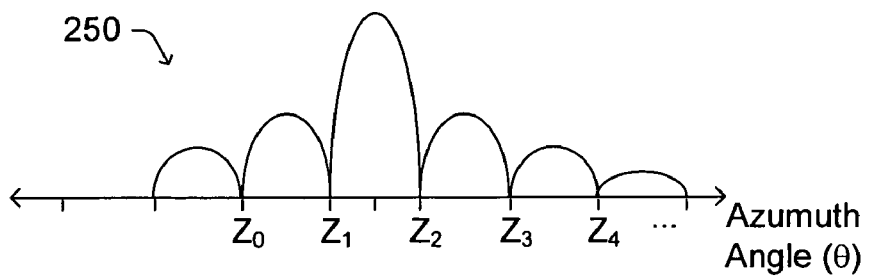
FIG. 3 is an illustrative diagram depicting selected features of an improved base station having a smart directional antenna, in accordance with certain exemplary implementations of the present invention.
Figure 3:
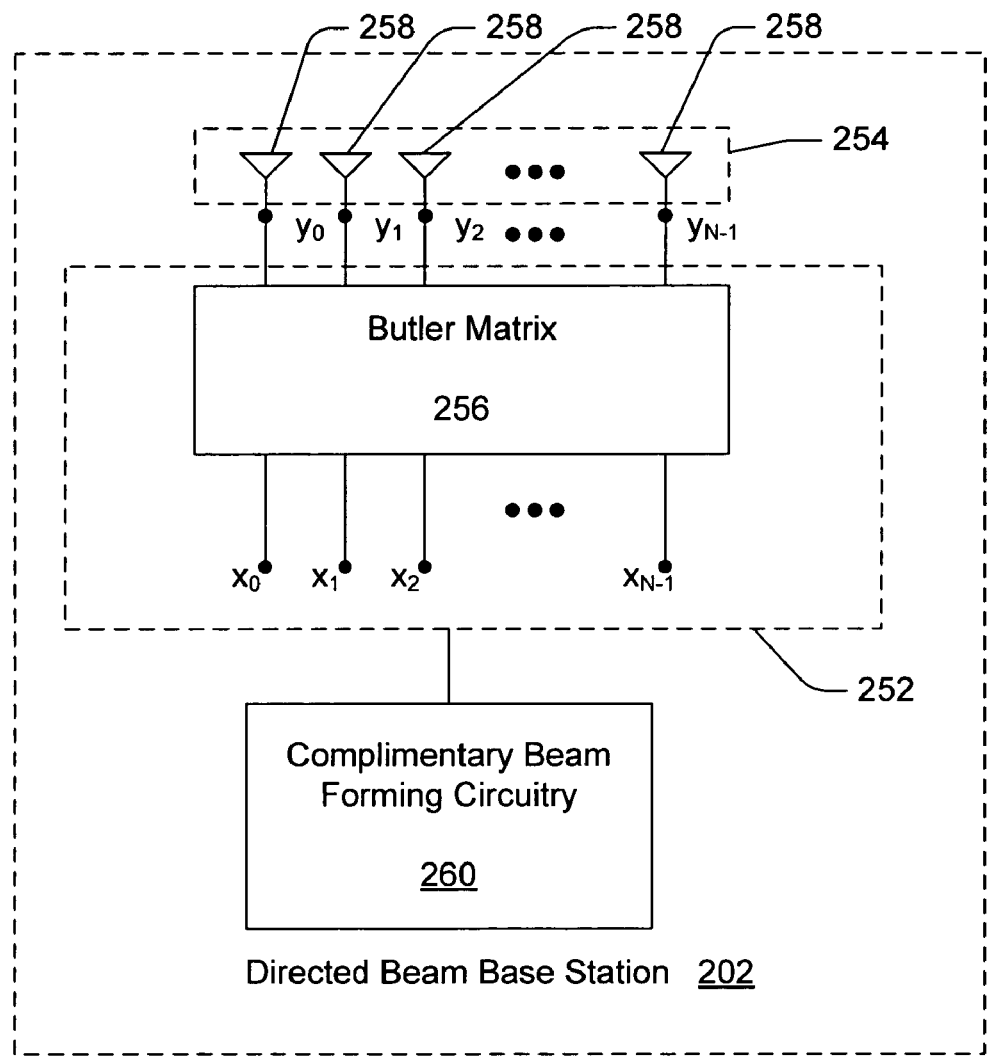

Attention is drawn to FIG. 3, which depicts certain features of exemplary improved base station 202. Here, a transmitter 252 is shown as being operatively coupled to an antenna array 254. In this example, antenna array 254 includes a plurality of elements 258. In certain other implementations, a smart antenna includes a transmitter that is operatively combined with an antenna array. Transmitter 252, in this example, includes a Butler Matrix 256 that is configured to selectively provide energy to one or more elements 258. Transmitter 252 is also operatively coupled to complementary beamforming circuitry 260, which is configured to selectively modify the operation of transmitter 252. An exemplary beam pattern 250 from a smart antenna 254 is also depicted to illustrate that a downlink beam may also have side lobes.

Figure 33:
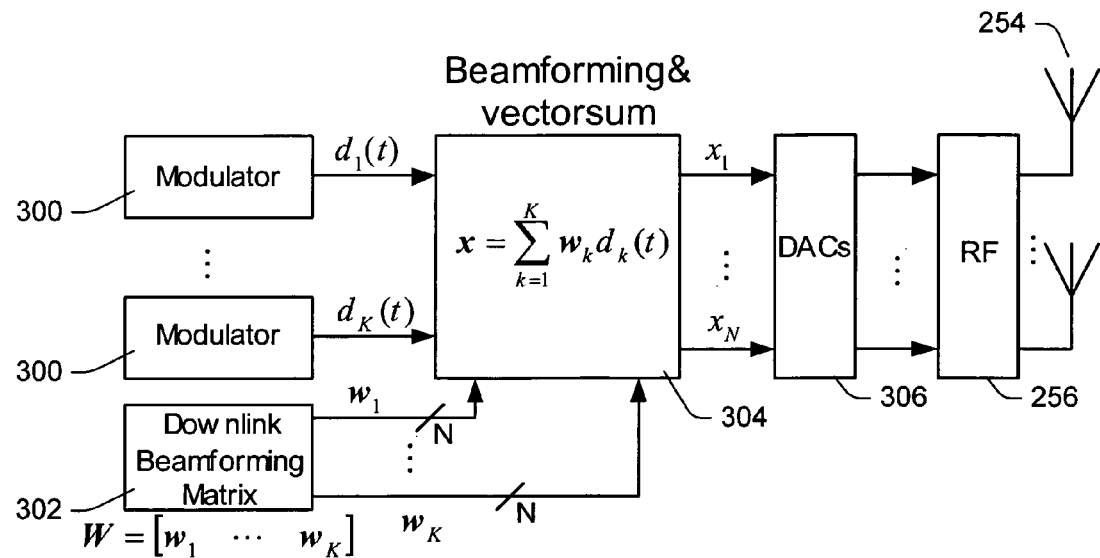
FIGS. 33–34 are block diagrams depicting certain features of a conventional base station without complementary beamforming capabilities.

Reference is made to FIG. 33, which is a block diagram illustrating certain features of a conventional beamforming transmitter. Here, a plurality (K) of modulators 300 provide $d_1(t), d_2(t), \ldots, d_K(t)$ modulated signals to beamforming and vector sum function 304. A downlink beamforming matrix function 302 provides N-by-K matrix $W=[w_1, \ldots, w_K]$ to beamforming and vector sum function 304. In beamforming and vector sum function 304, $x_1, \ldots x_K$ digital signals are generated based on $$x = \sum_{k=1}^{K} w_k d_k(t).$$

Figure 34:
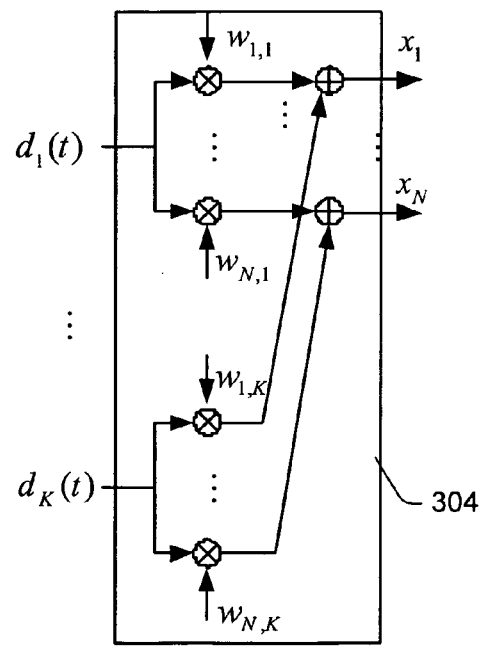

By way of further example, FIG. 34 depicts further details of an exemplary beamforming and vector sum function 304.

With attention directed back to FIG. 33, digital signals $x_1, \ldots, x_K$ are then each provided to a corresponding digital-to-analog converter (DAC) 306. The resulting analog signals $x_1, \ldots, x_K$ are then provided to an RF function 256 and corresponding $y_1, \ldots y_K$ RF signals are provided to corresponding elements in array antenna 254.

Section 2: Single Beam Complementary Beamforming (SBCBF)

As described above, increasing the range of 802.11 networks without increased transmit power and using standard clients is possible with smart antennas, such as, for example, directional high-gain antennas. Using directional high gain antennas, it is possible to direct the energy in a given direction and hence increase the range in that direction. However, the media access technique in 802.11 is CSMA which is a listen-before-talk scheme. Forming directional beams has the side effect of hiding the transmitted energy from a large proportion of the clients in the network; i.e, negatively impacting the carrier sense mechanism in the network. An 802.11 user station measures the energy transmitted from access points and other clients. If it cannot detect the presence of other transmissions, it attempts to gain access to the medium. Therefore, when directional antennas are used, many clients detect the medium as idle when in fact it is busy. This hidden beam problem has a severe effect on the performance of the network.

Fortunately, in practice, directional beams are not pencil beams. They generally have a main beam whose width depends on the size of the antenna aperture, and sidelobes which vary in different directions. Nevertheless, these beams tend to have very deep nulls in certain directions. In these directions, the network will suffer from the hidden beam problem the most. Since a given receiver's energy detect threshold is usually lower than it's decoding threshold, it is possible to direct a high power signal towards an intended client and yet ensure a minimum transmit power towards other clients in the network so that the signal may be detected by other clients.

Complementary beamforming, which is introduced in this description, is a novel technique that ensures a minimum transmit power in all directions while preserving the shape of the main beam. The complementary beamforming techniques described in subsequent sections ensure that multiple transmit beams in arbitrary directions are complemented by another beam in all other directions. The complementary beam does not interfere with the intended beams and increases the probability that other users in the network can detect the signal.

In this Section, a complementary beamforming technique is described for use with a single beam communication system. This single beam complementary beamforming (SBCBF) technique is illustrated using an improved base station having a loss-less Butler matrix network as the means of forming the directional beams with phased array antennas. It should be understood, however, that the SBCBF technique can be applied to other types of beamforming networks.

Figure 4:
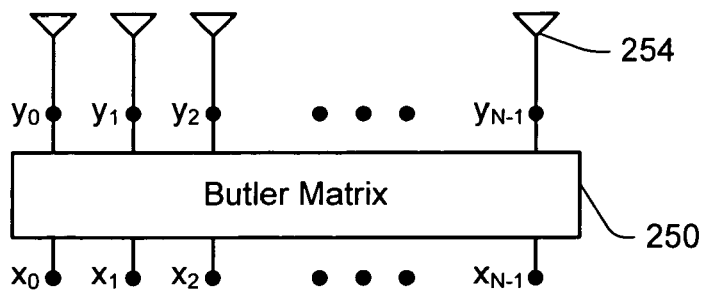
FIG. 4 is an illustrative diagram depicting a Butler Matrix for use within an improved base station having a smart directional antenna, in accordance with certain exemplary implementations of the present invention.

FIG. 4 depicts Butler Matrix 250 and a linear array antenna 254 with N elements connected thereto. Butler Matrix 250 includes N input ports $(x_0, x_1, x_2, \ldots, x_{N-1})$ and N output ports $(y_0, y_1, y_2, \ldots, y_{N-1})$.

For a single-beam operation, the transmit signal is fed into one of the input ports of the Butler matrix. The result is a directional beam from the antenna in a given direction. For instance, if the transmit signal is fed into input port 0, the beam is directed at boresight. The beam pattern depends on the number of antenna elements and the antenna element spacing.

Figure 5:
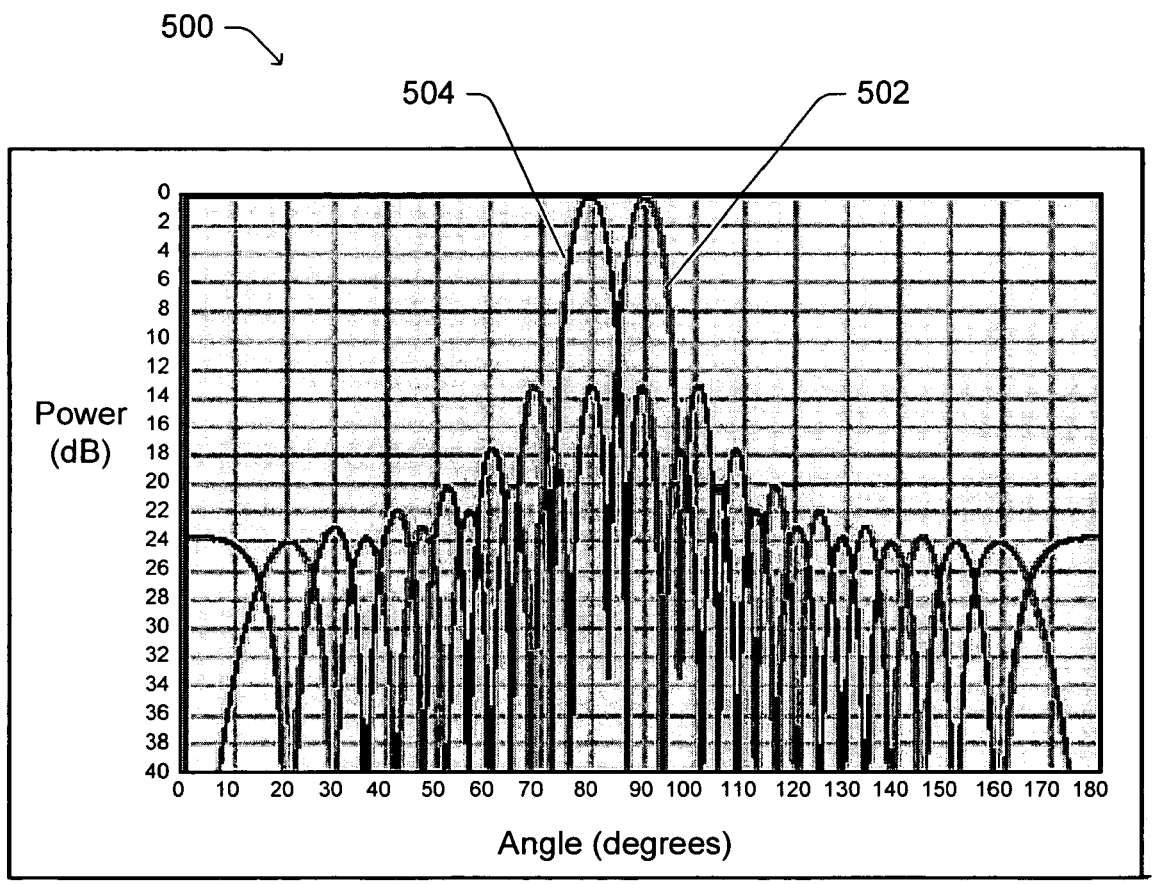
FIG. 5 is a graph depicting the signal level output (dB) for certain ports of the Butler Matrix of FIG. 4, in accordance with certain exemplary implementations of the present invention.

A graph 500 in FIG. 5 shows the output beams 502 and 504 due to transmit signals at input port $x_0$ and input port $x_3$, respectively, of Butler Matrix 250 for a linear array of 16 elements with half-wavelength spacing. As shown, beams 502 and 504 have very deep nulls in certain directions and the highest sidelobe levels are around 14 dB down from the main lobe's peak.

SBCBF reduces the effect of the nulls and increases the sidelobe levels without a severe power penalty to the main beam. SBCBF techniques may be implemented in a variety of ways. In this Section, two different exemplary implementations are illustrated, namely a post-combining SBCBF implementation and a pre-combining SBCBF implementation.

Figure 6:
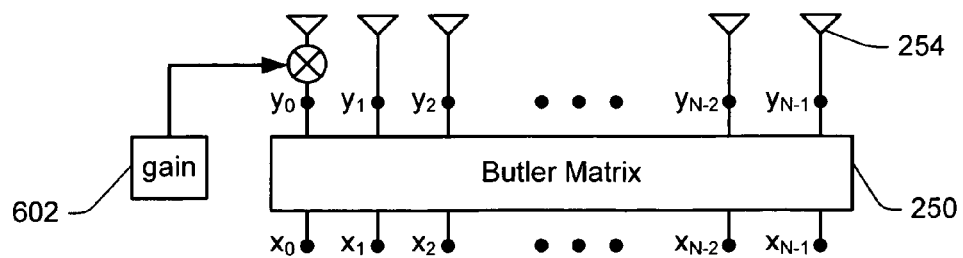
FIG. 6 is an illustrative diagram depicting a modified Butler Matrix for use within an improved base station having a smart directional antenna, in accordance with certain exemplary implementations of the present invention.

An exemplary post-combining SBCBF implementation is depicted in FIG. 6. Here, a gain mechanism 602 is configured to modify the signal at output port $y_0$. A complementary beam is then formed due to the increase in gain.

Mathematically, this may be described as:

$$y_i = \begin{cases} \gamma y_i & i = 0 \\ y_i & \text{otherwise} \end{cases} \quad \gamma \geq 1 \quad 0 \leq i \leq N-1$$

To ensure the same output power as with no complimentary beamforming the output voltage on all the ports should be adjusted by a scaling factor:

$$G_s = \sqrt{\frac{N}{\gamma^2 + N - 1}}$$

The power penalty for the main beam will be:

$$\Delta P = \frac{(\gamma + N - 1)^2}{N(\gamma^2 + N - 1)}$$

or in dB:

$$\Delta P_{dB} = 10\log\left(\frac{(\gamma + N - 1)^2}{N(\gamma^2 + N - 1)}\right)$$

For example, for a 16 element array, if $\gamma=3.5$, then the power loss is about 1 dB.

Figure 7:
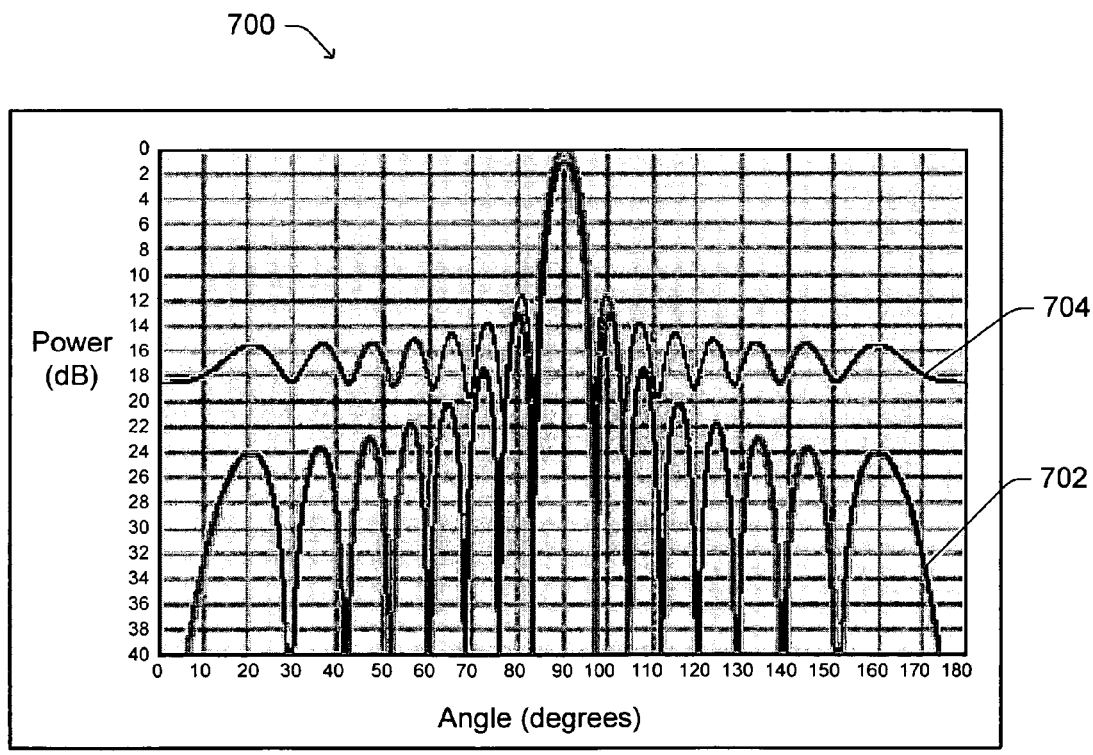
FIG. 7 is a graph depicting the signal level output (dB) for certain ports of the modified Butler Matrix of FIG. 6, in accordance with certain exemplary implementations of the present invention.

Graph 700 in FIG. 7 depicts the shape of a transmit beam 702 without SBCBF applied and a transmit beam 704 with SBCBF applied. Here, the transmit beam is due to a signal at port $x_0$ of Butler Matrix 250. As shown, the output with complementary beamforming (transmit beam 704) has higher sidelobes in all directions and removes all the deep nulls except for the nulls on the main beam. In this example, the main beam's peak power is about 1 dB lower than that without complementary beamforming.

2.1 Exemplary Pre-Combining SBCBF Implementation

With an exemplary pre-combining approach, the complementary beam is formed by feeding the transmit signal to the appropriate input port of the Butler matrix and at the same time feeding a fraction ($\Sigma$) of the transmit signal to the other input ports.

Figure 8:
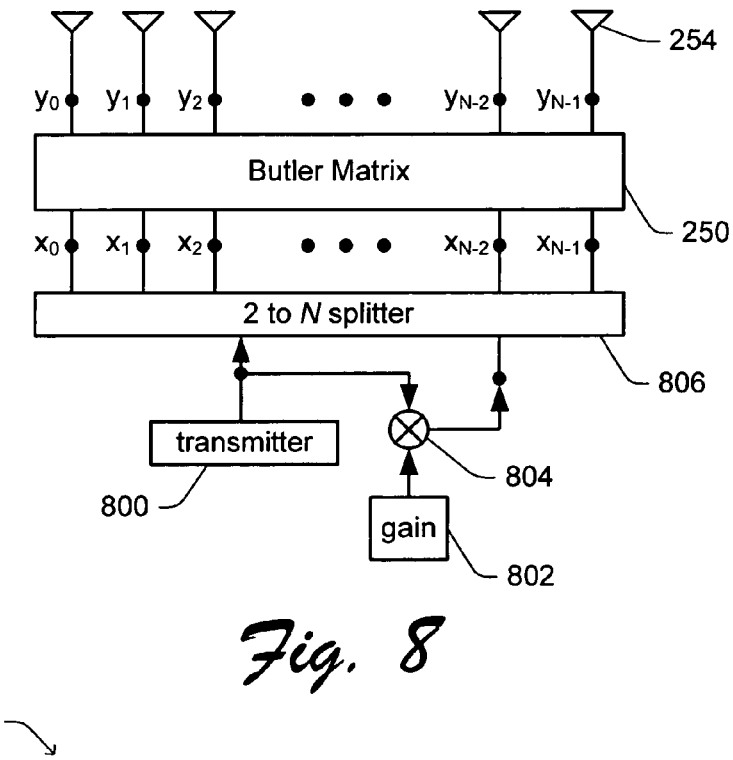
FIG. 8 is an illustrative diagram depicting a further modified Butler Matrix for use within an improved base station having a smart directional antenna, in accordance with certain exemplary implementations of the present invention.

FIG. 8 depicts an exemplary pre-combining SBCBF arrangement for use in base station 202. Here, the transmitter output 800 if combined with a gain 802 in combiner 804. The output of combiner 804 is applied along with transmitter output in a 2-to-N splitter 806, which then provides signals to Butler Matrix 250.

Mathematically, the signals at the input ports of Butler Matrix due to intended transmission through the ith port may be described as:

$$x_j = \begin{cases} x_i & j = i \\ \varepsilon x_i & \text{otherwise} \end{cases} \quad \varepsilon < 1 \quad 0 \le j \le N - 1$$

In other words, splitter 806 directs the transmitted signal to the appropriate input port $x_i$ and an attenuated version of the same signal to the other N−1 input ports of Butler Matrix 250. To ensure the same output power as with no complimentary beamforming the input voltage on all the ports should be adjusted by a scaling factor:

$$G_s = \frac{1}{\sqrt{1 + (N - 1)\varepsilon^2}}$$

Here, the power penalty for the main beam is:

$$\Delta P = 1 + (N-1)\varepsilon^2$$

or in dB:

$$\Delta P_{dB} = 10\log(1 + (N-1)\varepsilon^2)$$

By way of example, for a 16 element array, if $\Sigma=0.135$, the power loss is about 1 dB.

Figure 9:
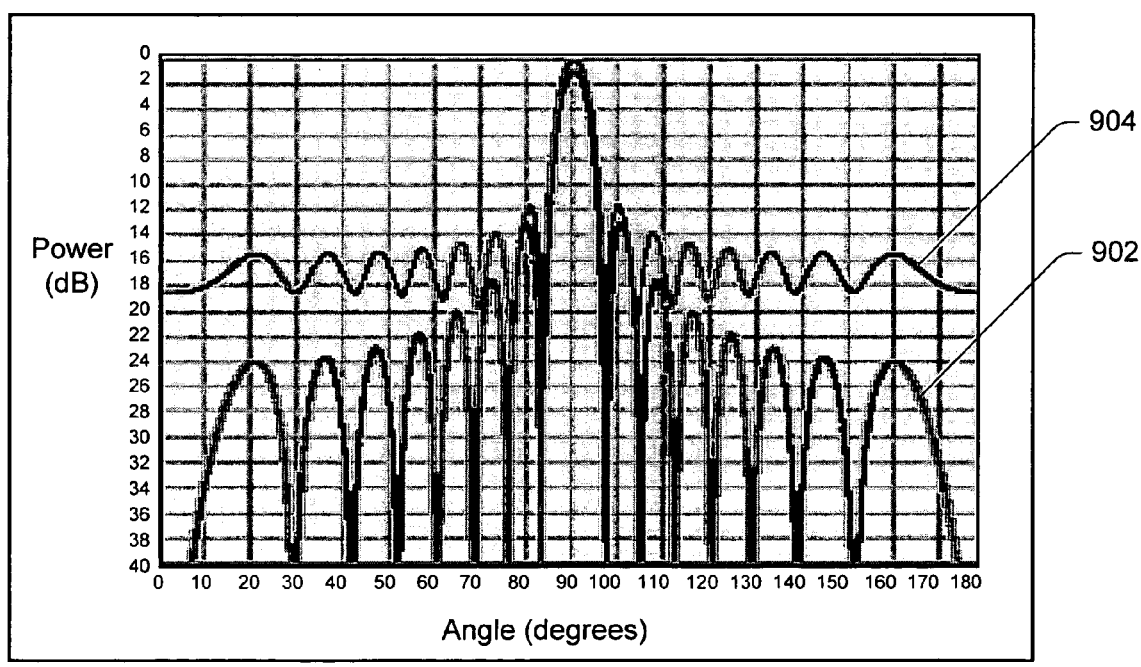
FIG. 9 is a graph depicting the signal level output (dB) for certain ports of the further modified Butler Matrix of FIG. 8, in accordance with certain exemplary implementations of the present invention.

Graph 900 in FIG. 9 depicts the shape of a transmit beam 902 without SBCBF applied and a transmit beam 904 with SBCBF applied to a signal at port $x_0$ of Butler matrix 250. As shown transmit beam 904 with complementary beamforming has higher sidelobes in all directions and removes all the deep nulls except for the nulls on the main beam. Here, the main beam's peak power is about 1 dB lower than that without complementary beamforming.

Section 3: Complementary Beamforming (CBF)

In this Section, some further exemplary complementary beamforming techniques are described.

As mentioned above, complementary beamforming can substantially reduce or even eliminate the potential for hidden beam problems. One exemplary application of complementary beamforming is in smart antennas enhancements to IEEE 802.11 wireless communication systems that may suffer from the hidden beam problem. Here, for example, some user stations may be nulled out by the beamformer and in a busy period wrongly determine that the channel is idle. This can cause these users to transmit packets in a busy period and cause packet collisions. For the case that the downlink channel is busy, the complementary beamforming (CBF) techniques provided herein are designed to significantly reduce the probability of the aforementioned packet collisions.

In this Section, exemplary CBF techniques are described for both the intended and silent users and prove that, when compared to conventional methods, for a negligible incurred power loss for the intended users, the effects of the hidden beam problem caused by the unintended users in the system can be significantly reduced. Additionally, in this Section, a second application of complementary beamforming to smart antenna enhancement of wireless cellular systems will be discussed. Those skilled in the art will recognize, therefore, that the methods and apparatuses of the present invention are adaptable to other types of wireless communication systems.

3.1 The Hidden Beam Problem

To further illustrate the situation, consider a scenario when a wireless communication system has a base station with m transmit antennas and the base station transmitter simultaneously transmits to k user stations (users). Without loss of generality, it is assumed in this example that $k \le m$.

A conventional beamformer seeks to increase the power pointed to the k desired users. Consider a scenario where there are m=2 transmit antennas and k=1 intended users. Let the channel matrix to the desired user be given by ($\alpha$, $\beta$). A conventional beamformer then induces weights:

$$w_1 = \frac{\bar{\alpha}}{\sqrt{|\alpha|^2 + |\beta|^2}} \text{ and } w_2 = \frac{\bar{\beta}}{\sqrt{|\alpha|^2 + |\beta|^2}}$$

at the transmitter, where $\bar{\alpha}$ and $\bar{\beta}$ are the conjugates of $\alpha$ and $\beta$ respectively. If $c_1$ is the intended transmit signal at time 1 for user 1, then $w_1 c_1$ and $w_2 c_1$ are transmitted signals from antennas 1 and 2 respectively. The intended user receives the signal (1) $r_1 = \alpha w_1 c_1 + \beta w_2 c_1 + n_1 = \sqrt{|\alpha|^2 + |\beta|^2} c_1 + n_1$ where $n_1$ is the noise.

It can then be observed that the signal to noise power ratio of the desired user improves by a factor of $10\log_{10}(|\alpha|^2+|\beta|^2)$ dB.

The above improvement for the above transmission scenario does not come for free, however. Let an unintended user have channel matrix $((-\bar{\beta},\bar{\alpha}))$. Then the signal at this unintended user is given by $$y=-\bar{\beta}w_1c_1+\bar{\alpha}w_2c_1+n_1=n_1 \quad (2)$$

where $n_1$ is the noise and the unintended user receives no signal.

As such, there is no version of the transmitted signal at this unintended user. This by itself may not seem to pose a serious problem, since after all the transmission was not intended for this user station. But it turns out that this can cause a problem in beamforming enhancements to the IEEE 802.11 WLAN standard based systems. In systems designed based on this standard, all user stations and the base station (e.g., access point) share the same channel for both uplink and downlink transmissions. Each user senses the channel and only transmits packets if it determines that the channel is not busy. In the aforementioned scenario, the unintended user may determine that the channel is idle and transmit uplink packets. These transmissions in turn may cause packet collisions that can reduce the throughput of the system. This then is the hidden beam problem.

3.2 Complementary Beamforming

One important aspect of complementary beamforming is that much less power is needed for an unintended user station to correctly detect a busy period than is required for correct detection of a transmitted packet. This makes it possible to provide improved beamforming schemes that, when compared to conventional beamforming schemes, incur a meager loss to the power pointed to the intended user station(s), while significantly improving the probability of correct detection of busy periods for unintended user stations.

3.3 Exemplary Solution to the Hidden Beam Problem

In wireless communications, it is well understood that detecting channel activity is much simpler than decoding the received word. For example, an error in detection of channel activity may occur when a transmitted codeword is confused with an all zero signal. In contrast, a decoding error may occur when a transmitted signal is confused with other code words.

One may arrive at the above conclusion using tools of information theory. At code rates above the channel capacity, for example, Shannon has proved that the block decoding error probability asymptotically tends to one and that the bit error rate is bounded below by a positive number. However, even at transmission rates above capacity, it is easy to observe that the probability of channel activity detection error asymptotically goes to zero as the block length goes to infinity.

The above is considered in designing the detection criteria for channel activity in IEEE 802.11 WLAN standards. Each device listens to the channel in some time window and compares the energy collected in this window to a threshold called the CCD. Activity is detected only if the collected energy is greater than the CCD value. It has been found that IEEE 802.11 devices generally tend to require much less receive power to correctly determine channel activity than to decode the transmitted signals.

This motivates solutions to the hidden beam problem in that a beam pattern may be constructed which directs most of the transmitted power to the intended recipients while directing a small fraction of the total power to unintended users. With such a beam pattern the unintended users will all sense the transmission to the desired users with high probability and will likely remain silent during a busy downlink period. This in turn reduces the packet collision probability.

To construct such a beam pattern in this Section the following notation is employed:

$\delta_j$ denotes a k-dimensional column vector with j-th component equal to 1 and other components equal to zero.

For any vector X, $X^T$ and $X^H$ respectively denote the transpose and Hermitian of X.

For any matrix D, $W_D$ denotes the vector space spanned by the columns of D.

The channel from transmit antenna l to the intended user j is given by $a_{l,j}$.

$A_j$ denotes the column vector $(\alpha_{1,j}, \alpha_{2,j}, \ldots, \alpha_{m,j})^T$. Vector $A_j$ may be referred to as the spatial signature of user j.

A denotes the matrix whose j-th column is $A_j$.

$R^t=(r_1^t,r_2^t,\ldots,r_k^t)$ and $X^t=(x_1^t,x_2^t,\ldots,x_m^t)$ respectively denote the received signals at intended users j=1, 2, ..., k at time t and signals transmitted from antennas 1, 2, ..., m.

$C^t=(c_1^t,c_2^t,\ldots,c_k^t)$, where $c_j^t$ is the signal intended to the j=1, 2, ..., k desired user at time t.

For any matrix A, Tr(A) denotes the trace (sum of diagonal elements of A).

$N^t=(n_1^t,n_2^t,\ldots,n_m^t)$ is the noise vector components at time t at the intended users; thus, it is well-known that:

$$R_t = X^t A + N^t \quad (3)$$

In most cases, these components are assumed to be Gaussian with variance $\sigma^2$ per complex dimension. No assumptions are made on the statistics of the matrix A. It will be assumed that $c_j^t$, j=1, 2, ..., k, t=1, 2, ..., L are elements of a signal constellation with average signal $E[c_j^t]=0$.

It is also assumed that the elements of the signal constellation are normalized so that their average power is $E[|c_j^t|^2]=1$. In general $X^t=C^tB$ where B is referred to as the beamforming matrix.

The choice of B depends on the beamforming strategy and many approaches for the selection of B are suggested in existing literature. By way of I example, assuming that the matrix A is known at the transmitter and the existence of $(A^HA)^{-1}$, for a zero-forcing beamformer $$B = \frac{(A^H A)^{-1} A^H}{\sqrt{Tr((A^H A)^{-1})}} \quad (4)$$

and $$X^t = \frac{C^t(A^H A)^{-1} A^H}{\sqrt{Tr((A^H A)^{-1})}}$$

For a maximum SINR beamformer, $$B = \frac{\left(A^H A + \frac{1}{SNR}I\right)^{-1} A^H}{\sqrt{Tr\left(\left(A^H A + \frac{1}{SNR}I\right)^{-2} A^H A\right)}} \quad (5)$$

where $$SNR = \frac{1}{\sigma^2}.$$

Under the above assumptions the total transmit power is easily computed to be 1. Note that a zero-forcing beamformer may not be appropriate in some applications as it may enhance the noise. Thus, a maximum SINR beamformer may be more appropriate in some applications.

For simplicity, however, a technique for the zero-forcing beamformer will be illustrated in this Section. Nonetheless, it is noted that the method presented here generalizes to the maximum SINR case as well. This generalization is described in part.

Here, it is assumed that the spatial signature matrix A is constant during the transmission of a packet and varies from one packet to another.

Thus, for a zero-forcing beamformer, the received signal at the receiver is given by $$R^t = \frac{C^t}{\sqrt{Tr((A^H A)^{-1})}} + N^t,$$

and it is observed that each intended user j=1, 2, . . . , k receives a noisy version of its intended signal scaled by a factor $Tr((A^H A)^{-1})$.

If an unintended user has spatial signature $B=(b_1, b^2, \ldots, b_m)^T$ orthogonal to all the rows of A, then the user receives the signal $$y^t = X^t B + \eta^t = C^t (A^H A)^{-1} A^H B / \sqrt{Tr((A^H A)^{-1})} + \eta^t = \eta^t,$$

at time t, where $\eta^t$ is Gaussian noise. This means that such a user does not receive any signal at all. The same is true for maximum SINR beamforming. As mentioned above, such an unintended user can confuse a busy downlink period with a silent period and transmit packets during a busy period. This can cause unwanted collisions and reduce the efficiency of the system.

Whenever a k×m beamforming matrix is fixed during transmission of a packet, then, any unintended user that has spatial signature in the orthogonal complement of the subspace generated by the rows of the beamforming matrix receives no signal at all. This conclusion is also true for the case of maximum SINR beamforming. This motivates the use of different beamforming matrices at different instances of time during the transmission of downlink packets, so that the effects of the hidden beam problem can be reduced.

3.3.1 An Exemplary Proposed Scheme:

It is observed that the subspace $W_A$ is a k-dimensional subspace of the complex m-dimensional complex space and has an orthogonal complement $W_A^\perp$ of dimension m−k. Let $U_0, U_1, \ldots, U_{m-k-1}$, form an orthonormal basis for $W_A^\perp$. In other words, $U_0, U_1, \ldots, U_{m-k-1}$ are mutually orthogonal m-dimensional column vectors of length one in $W_A^\perp$. Clearly, $U_j^H A_i = 0$ for $0 \leq j \leq m-k-1$ and $1 \leq i \leq k$.

With this in mind, as part of the scheme the base station transmitter constructs matrices $Z_1, Z_1, \ldots, Z_L$, where L is the length of downlink transmission period, such that these matrices satisfy the following four properties (A–D).

A: For all $1 \leq i \leq L$, the matrix $Z_i$ is a k×m matrix whose rows are in the set $\{0, \pm U_0^H, \pm U_1^H, \ldots, \pm U_{m-k-1}^H\}$ B: If L is even, then, $Z_2 = -Z_1, Z_4 = -Z_3, \ldots, Z_L = -Z_{L-1}$ C: If L is odd, then $Z_2 = -Z_1, Z_4 = -Z_3, \ldots, Z_{L-1} = -Z_{L-2}, Z_L = 0$, and D: Each element $+U_0^H, -U_0^H, +U_1^H, -U_1^H, \ldots, U_{m-k-1}^H, -U_{m-k-1}^H$ appear p times in the list of Lk rows of $Z_1, Z_1, \ldots, Z_L$ for some positive integer p. If this cannot be exactly satisfied, the scheme can include having the number of these appearances sufficiently close to each other.

From Property D, it is observed that $$k(L-1) \leq 2p(m-k) \leq Lk \quad (6)$$

Because $p \geq 1$, from the above inequality, for $$L < \frac{2(m-k)}{k},$$

Property D cannot always be exactly satisfied. Thus, one cannot always provide a perfectly balanced appearance of $+U_0^H, -U_0^H, +U_1^H, -U_1^H, \ldots, +U_{m-k-1}^H, -U_{m-k-1}^H$ for extremely short packets.

There are a number of ways to construct matrices of $Z_1, Z_1, \ldots, Z_L$ that satisfy Property D approximately or exactly when possible. In one simple approach, let the rows of $Z_{2i-1}$ be respectively $U_{0 \oplus i}^H, U_{1 \oplus i}^H, \ldots, U_{k-1 \oplus i}^H$ where i⊕j denote (i+j) mod (m−k) for i=1, 2, 3, . . . , [L/2] and let $Z_{2i} = -Z_{2i-1}$. This gives the matrices $Z_1, Z_1, \ldots, Z_L$ whenever L is even. Note that $Z_L$ is given by Property C whenever L is odd.

It can be seen that the matrices $Z_1, Z_1, \ldots, Z_L$ given by the above construction substantially satisfy the above Properties. Other constructions are also possible.

Once $Z_1, Z_1, \ldots, Z_L$ are constructed, at each time t, the transmitter chooses the beamforming matrix $$S^t = \left[ (A^H A)^{-1} A^H / \sqrt{Tr((A^H A)^{-1})} + \frac{1}{\sqrt{k}} \varepsilon Z_i \right] \quad (7)$$

where $\varepsilon \geq 0$ is a fixed positive number. The choice of $\varepsilon$ governs the trade-off between the power pointed to the intended users and that pointed to unintended users. By increasing the power pointed to intended users, the intended users enjoy better channels, while by pointing more power to unintended users, better channel activity detection during the busy periods can be achieved. This trade-off will be analyzed in the next subsection and criteria for the choice of $\varepsilon$ determined.

Note that the same method applies to the case of maximum SINR beamforming. Also, in this exemplary scheme the beamforming matrix varies from one time to another. This causes a small fraction of power to be pointed in every direction of the coverage space such that unintended receivers can determine channel activity periods with higher probabilities.

3.4 Analysis of Complementary Beamforming

We analyze the exemplary complementary beamforming scheme of as proposed above both for the intended and unintended receivers.

3.4.1 The Power Penalty for the Intended Users:

The addition of the term $$\frac{1}{\sqrt{k}} \varepsilon Z_i$$

to the matrix $(A^H A)^{-1} A^H \sqrt{Tr((A^H A)^{-1})}$ increases the transmit power. To compute the penalty, the orthogonality of $U_1$, $U_1, \ldots, U_L$ and the columns of A can be used to conclude that $Z_t A = 0$ for all $t = 1, 2, \ldots, L$. Thus, one can compute the receive word for intended users to be $$R^t = C^t S^t A + N^t = \frac{C^t}{\sqrt{Tr((A^H A)^{-1})}} + N^t,$$

which is the same as the conventional beamforming. In contrast, in the case of the exemplary complementary beamforming scheme, the matrix equality $$Tr[(Y+W)(Y+W)^H] + Tr[(Y-W)(Y-W)^H] = 2Tr(YY^H) + 2Tr(WW^H)$$

and Properties B and D used to compute the average transmitted power $$\frac{\sum_{t=1}^{L} Tr(S_t S_t^H)}{L} = 1 + \frac{\sum_{t=1}^{L} Tr(Z_t Z_t^H)}{Lk} |\varepsilon|^2.$$

From Property D, we have $$\sum_{t=1}^{L} Tr(Z_t Z_t^H) = 2p(m-k)$$

thus $$\frac{\sum_{t=1}^{L} Tr(S_t S_t^H)}{L} = 1 + \frac{2p(m-k)}{Lk} |\varepsilon|^2.$$

One may now prove the following Theorem.

Theorem 1 The intended users in complementary beamforming when compared to the conventional method suffer a loss of at most $10 \log_{10}(1+|\varepsilon|^2)$.

Proof. This follows from the above and from Inequality (6).

3.4.2 Analysis of the Power Delivered to Silent Users:

Let $B = (b_1, b_2, \ldots, b_t)^T$ denote the channel of an arbitrary unintended user. One may then study the power received by this unintended user under complementary beamforming. To this end, it is recognized that the columns of matrix A and the vectors $U_1, U_1, \ldots, U_{m-k}$ span the complex m-dimensional space.

Thus, $$B = e_1 A_1 + \ldots + e_k A_k + d_1 U_1 + \ldots + d_{m-k} U_{m-k} \quad (8)$$

for some constants $e_1, e_2, \ldots, e_k$ and $d_1, d_2, \ldots, d_{m-k}$. Computing $B^H B$, provides $$\sum_{j=1}^{m} |b_j|^2 = (e_1^H, e_2^H, \ldots, e_k^H) A^H A (e_1^H, e_2^H, \ldots, e_k^H)^H + \sum_{j=1}^{m-k} |d_j|^2 \quad (9)$$

At time t, the unintended receiver now receives $$y^t = X^t B + \eta^t = C^t S^t B + \eta^t$$

By replacing for $S^t$ and B from Equations (7) and (8) and observing that $(A^H A)^{-1} A^H A_j = \delta_j$, $A^H U_i = 0$, and $Z_t A_i = 0$, one arrives at the conclusion that $$S^t B = \frac{(e_1^H, e_2^H, \ldots, e_k^H)^H}{\sqrt{Tr((A^H A)^{-1})}} + \frac{\varepsilon}{\sqrt{k}} \sum_{j=1}^{m-k} d_j Z_t U_j \quad (10)$$

Next the average expected receive signal power is computed as $$P_{av} = \frac{\sum_{t=1}^{L} E[|y^t|^2]}{L} = \frac{\sum_{t=1}^{L} Tr(S^t BB^H (S^t)^H)}{L} \quad (11)$$

However, since $Z_{2l} = -Z_{2l-1}$ for $l = 1, 2, \ldots,$ $$\left[\frac{L}{2}\right]$$

is assumed, one can use Equation (10) and with manipulations arrive at $$Tr(S^{2l} BB^H (S^{2l})^H + S^{2l-1} BB^H (S^{2l-1})^H) =$$

$$\frac{2 \sum_{j=1}^{m} |e_j|^2}{Tr((A^H A)^{-1})} + \frac{|\varepsilon|^2}{k} \sum_{j=1}^{m-k} |d_j|^2 [Tr(Z_{2l-1} U_j U_j^H Z_{2l-1}^H) + Tr(Z_{2l} U_j U_j^H Z_{2l}^H)].$$

Using the above and after manipulation $$P_{av} = \frac{\sum_{j=1}^{m} |e_j|^2}{Tr((A^H A)^{-1})} + \frac{|\varepsilon|^2}{kL} \sum_{j=1}^{m-k} |d_j|^2 \sum_{t=1}^{L} Tr(Z_t U_j U_j^H Z_{2l}^H).$$

The sum $$\sum_{t=1}^{L} Tr(Z_t U_j U_j^H Z_{2l}^H)$$

is exactly equal to the number of times that $\pm U_j$ appears in the list of the rows of $Z_1, Z_1, \ldots, Z_L$. By Property D this amounts to $2p$.

Thus, $$P_{av} = \frac{\sum_{j=1}^{n}|e_i|^2}{Tr((A^H A)^{-1})} + |\varepsilon|^2 \frac{2p}{kL}\sum_{j=1}^{m-k}|d_j|^2 \quad (12)$$

One can now proceed to lower bound $P_{av}$. To this end, the following theorem can be proven.

Theorem 2. Let $\lambda_{min}(A^H A)$ and $\lambda_{max}(A^H A)$ respectively denote the minimum and maximum eigenvalues of $A^H A$. Then provided that $$|\varepsilon|^2 \leq \frac{(m-k)}{k}\frac{\lambda_{min}(A^H A)}{\lambda_{max}(A^H A)} \quad (13)$$

complementary beamforming guarantees a fraction $$|\varepsilon|^2 \frac{\sum_{j=1}^{m}|b_j|^2}{m}$$

of the transmitted power to an unintended receiver whose spatial signature is $B=(b_1, b_2, \ldots, b_m)$.

Proof: Let an unintended user with spatial signature given by $B=(b_1, b_2, \ldots b_m)$ be given. Suppose that the Inequality (13) holds. From Equations (8) and (12), it is observed that $$P_{av} = |\varepsilon|^2 \frac{2p}{kL}\sum_{i=1}^{m}|b_i|^2 - (e_1^H, e_2^H, \ldots, e_k^H)G(e_1^H, e_2^H, \ldots, e_k^H)^H$$

where $$G = \left[|\varepsilon|^2 \frac{2p}{kL} A^H A - \frac{I}{Tr((A^H A)^{-1})}\right]$$

and I is the identity matrix. The matrix G is Hermitian, thus it can be concluded that $$P_{av} \geq |\varepsilon|^2 \frac{2p}{kL}\sum_{i=1}^{m}|b_i|^2 - \lambda_{max}(G)\sum_{i=1}^{k}|e_k|^2 \quad (14)$$

where $\lambda_{max}(G)$ is the maximum eigenvalue of G.
Hence, $$\lambda_{max}(G) = |\varepsilon|^2 \frac{2p}{kL}\lambda_{max}(A^H A) - \frac{1}{Tr((A^H A)^{-1})}$$

Next, it can be shown that $\lambda_{max}(G) \leq 0$.

Here, $$Tr((A^H A)^{-1}) \leq \frac{k}{\lambda_{min}(A^H A)}$$

thus using Condition (13)

$$\frac{1}{Tr((A^H A)^{-1})} \geq \frac{\lambda_{min}(A^H A)}{k} \geq \frac{|\varepsilon|^2 \lambda_{max}(A^H A)}{m-k}$$

which gives $$|\varepsilon|^2 \frac{2p}{kL}\lambda_{max}(A^H A) \leq \frac{2p(m-k)}{kL}\frac{1}{Tr((A^H A)^{-1})} \leq \frac{1}{Tr((A^H A)^{-1})}.$$

using Inequality (6). It can be concluded from the above that $\lambda_{max}(G) \leq 0$. Using Equation (14), this implies that $$P_{av} = |\varepsilon|^2 \frac{2p}{kL}\sum_{i=1}^{m}|b_i|^2 \geq |\varepsilon|^2 \frac{2pm}{kL}\frac{\sum_{i=1}^{m}|b_i|^2}{m} \quad (15)$$

Using the Inequality (6), it is determined that $$P_{av} \geq |\varepsilon|^2 \frac{\sum_{i=1}^{m}|b_i|^2}{m}.$$

It may not seem natural to the reader that the Condition (13) on $\varepsilon$ contains terms of the form $\lambda_{min}(A^H A)/\lambda_{max}(A^H A)$. This condition should not seem surprising, however, since in the case that the ratio $\lambda_{min}(A^H A)/\lambda_{max}(A^H A)$ is small, the matrix $A^H A$ is close to being singular. This means that even the intended users, do not receive significant signal powers. Practical beamforming schemes, when scheduling transmission to intended users always assure that the ratio $\lambda_{min}(A^H A)/\lambda_{max}(A^H A)$ is sufficiently large. In fact a ratio $$\lambda_{min}(A^H A)/\lambda_{max}(A^H A) \geq \frac{1}{3}$$

is generally an acceptable assumption. In the case of certain exemplary implementations, k=4, m=16xi. Thus, provided that the exemplary system's scheduling algorithm can guarantee that $$\lambda_{min}(A^H A)/\lambda_{max}(A^H A) \geq \frac{1}{30}$$

the above complementary beamforming scheme could be used to provide any fraction $|\varepsilon|^2 \leq 0.1$ of the transmitted power to unintended users.

For example, consider the case when there are m=2 and k=1 receive antennas. Assuming that the channel to the intended user is given by $A=(\alpha,\beta)^T$ it is observed that $\lambda_{min}(A^H A)/\lambda \max(A^H A)=1$ and as long as $|\epsilon|^2 \leq 1$, by the above theorem a fraction $|\epsilon|^2$ of the transmitted power is pointed to unintended users at the expense of a loss of at most $10 \log_{10}(1+|\epsilon|^2)$ to the intended user. With $\epsilon=0.1$, a power of 20 dB below transmit power can be guaranteed to any unintended users so that they can detect channel activity, while the power penalty for the intended user is only 0.044 dB.

The beamforming matrices $S_1$, and $S_2$ in this case are given by $$S_2 = \frac{1}{\sqrt{|\alpha|^2 + |\beta^2|}} (\overline{\alpha} + \epsilon \beta, \overline{\beta} - \epsilon \alpha)$$

with $S_{2l-1}=S$, and $S_{2l}=S_2$ for l=1, 2, ..., $$\left[\frac{L}{2}\right]$$

when the transmission period is of length L with $$S_L = \frac{1}{\sqrt{|\alpha|^2 + |\beta^2|}} (\overline{\alpha}, \overline{\beta})$$

when L is odd.

Considering yet another example, let k=4 and m=16. Then the channel matrix A is a 16×4 matrix. The columns of this matrix are 16-dimensional vectors $A_1, A_2, A_3$, and $A_4$. Here, two cases may be recognized:

Conventional Beamforming:

In order to do conventional beamforming the beamforming matrix $$B = \frac{(A^H A)^{-1} A^H}{\sqrt{Tr((A^H A)^{-1})}}$$

needs to be computed. This matrix is then used for transmission.

Complementary Beamforming: In addition to the above computation, one also needs to compute an orthonormal basis of 16 dimensional vectors $U_0, U_1, U_2, \ldots, U_{11}$ for the orthogonal complement of the subspace spanned by the columns of A. This can be done, for example, using the Gram-Schmidt method and requires roughly the same number of operations as the computation of B.

The matrices $Z_0, Z_1, \ldots, Z_L$ are constructed as below. When L is odd, let $Z_L=0$. For any L (either even or odd), let $$\left\lfloor \frac{L}{2} \right\rfloor.$$

The matrix $Z_1$, $Z_3$, and $Z_5$ can be defined to have respectively rows equal to $U_0^H, U_1^H, U_2^H, U_3^H, U_4^H, H_5^H, U_6^H, U_7^H, U_8^H, U_9^H, U_{10}^H$, and $U_{11}^H$.

One may then periodically define $Z_1=Z_7=Z_{13}= \ldots ,$ $Z_3=Z_9=Z_{15}= \ldots ,$ $Z_5=Z_{11}=Z_{17}= \ldots ,$ and let $$S^t = \left[ (A^H A)^{-1} A^H \Big/ \sqrt{Tr((A^H A)^{-1})} + \frac{1}{\sqrt{k}} \epsilon Z_t \right]$$

be the complementary beamforming matrix at time t.

It can be observed from the above that complementary beamforming is approximately twice as much computationally intensive as conventional beamforming in this example.

The above exemplary schemes and others presented herein may be applied to other wireless communication systems. For example, a cellular network application can use this type of beamforming enhancement for TDMA systems. In these systems, beamforming can be used to increase SINR of some intended users, while a small amount of power can be pointed to all other users so that the control information also called USF (uplink state flag) which requires much lower data rates can be transmitted to all the users in the system.

The complementary beamforming technique presented above guarantees that in any flat fading and non-fading environment including even richly scattered environments, the power received by a user under complementary beamforming is at least a fraction of the power received by a user under omni transmission. For this reason the beamforming matrix varies from time to time. For this reason complementary beamforming may not be as easy to implement in analog environments.

Supposing, however, that this requirement is relaxed and to only require that in a non-scatterer free space environment, the power received by a user under complementary beamforming is at least a fraction of the power received by a user under omni-directional transmission. Then there are other ad hoc complementary beamforming solutions using fixed matrices. One such a solution may be to define matrices $P_0, P_1, \ldots, P_{m-k}$ to be matrices whose rows are respectively $U_0^H, U_1^H, \ldots, U_{m-k}^H$ and let the fixed beamforming matrix be given by $$S = \left[ (A^H A)^{-1} A^H \Big/ \sqrt{Tr((A^H A)^{-1})} + \frac{1}{\sqrt{k}} \epsilon \sum_{i=1}^{m-k} P_i \right] \quad (16)$$

Such a solution can be shown using simulations to be a complementary beamforming solution in a non-scattering free space environment. This solution is much more appealing for analog implementation.

Section 4: Multiple Beam Downlink Model

In this Section some exemplary uplink and downlink models are described.

Figure 10:
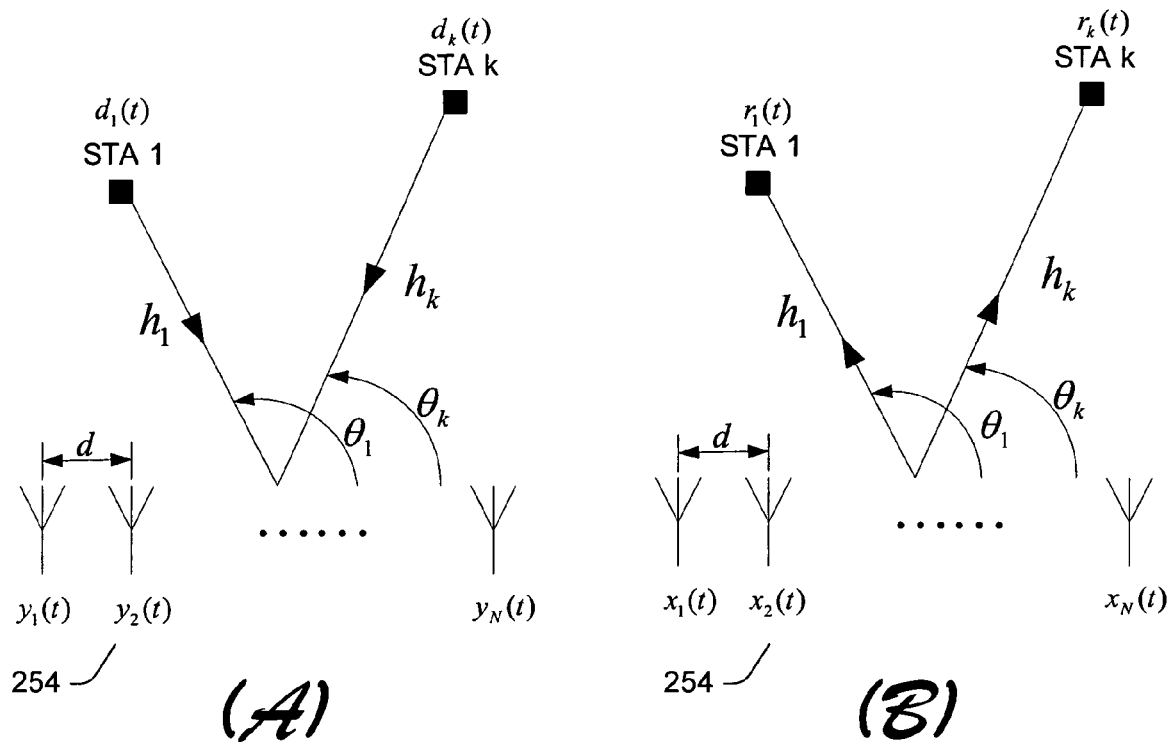
FIGS. 10A and 10B are illustrative diagrams depicting an uplink model and a downlink model, respectively, for the improved wireless communication system of FIG. 2, in accordance with certain exemplary implementations of the present invention.

Attention is drawn to FIGS. 10(A) and 10(B). FIG. 10(A) depicts an uplink model and FIG. 10(B) depicts a downlink model between a linear array antenna 254 having N elements and user stations Sta 1 and Sta 2.

In FIG. 10(A), it is assumed that the k-th user's signal arriving at an angle $\theta_k$ has a complex channel gain $h_k=|_k|e^{j\Phi_k}$. As such, the received signal y(t) can be modeled as follows $$y(t)=[h_1 a(\theta_1) h_2 a(\theta_2) \ldots h_K a(\theta_K)] d(t)+n(t)$$

where $a(\theta)$ represents a steering vector or spatial signature, $d(t)=[d_1(t)\ d_2(t)\ \ldots\ d_K(t)]^T$ is a uplink signal vector of K stations and n(t) is a AWGN vector. In the uniform linear array (ULA) 254 with N elements spaced a distance d, the steering vector becomes $$a(\theta) = \begin{bmatrix} 1 & e^{j\frac{2\pi}{\lambda}d\cos\theta} & \ldots & e^{j\frac{2\pi}{\lambda}(N-1)d\cos\theta} \end{bmatrix}^T$$

where $\lambda$ is wavelength. With knowledge of direction-of-arrivals (DOAs) and $|h_k|$ one can apply MMSE beamforming which provides the best SINR among linear equalizers.

In FIG. 10(B), since the channel gain can be assumed to be the same as that of the uplink in TDD mode, the received signal $r_k(t)$ at station k can be written as $$r_k(t) = h_k a^T(\theta_k) x(t) + n_k(t) = h_k \sum_{k=1}^{K} a^T(\theta_k) w_k d_k(t) + n_k(t)$$

where $$x(t) = \sum_{k=1}^{K} w_k d_k(t)$$

is the transmitted vector and $w_k$ represents the transmit weight vector for user k. In a vector form $$r(t) = [h_1 a(\theta_1) h_2 a(\theta_2) \ldots h_K a(\theta_K)]^T Wd(t) + n(t)$$

where $r(t)=[r_1(t)\ r_2(t)\ \ldots\ r_K(t)]^T$, and $W=[w_1\ w_2\ \ldots\ w_K]$ is the weight matrix.

One can then define steering matrix $A=[a(\theta_1)\ a(\theta_2)\ \ldots\ a(\theta_K)]$, channel magnitude matrix $h=\text{diag}(|h_1|\ |h_2|\ \ldots\ |h_K|)$, and channel phase matrix $\Phi=\text{diag}(e^{j\Phi_1}\ e^{j\Phi_2}\ \ldots\ e^{j\Phi_K})$.

As such, the received downlink vector can be written as $$r(t) = \Phi H Wd(t) + n(t)$$

where $H=hA^T$.

In scattering channel, the received downlink vector can be written as $$r(t) = HWd(t) + n(t)$$

where channel matrix H is composed of complex numbers.

With perfect knowledge of H, one has several downlink beamforming matrices:
(1) Pseudoinverse: $W=H^+=H^H(HH^H)^{-1}=A^*(A^TA^*)^{-1}h^{-1}$
(2) Matched Filter (MF): $W=A^*, A^*h, A^*h^{-1}$
(3) Windowed MF: $W=\text{diag}(b_0,b_1,\ldots,b_{N-1})A^*$, where $b_k$ is a windowing coefficient.

The following assumptions may be made:
(a) rank(A)=K.
(b) Non-zero channel gain ($|h_k|\neq 0$). Thus, h is non-singular.
(c) Non-zero windowing coefficient ($|b_k|\neq 0$). Thus, rank $(\text{diag}(b_0,b_1,\ldots,b_{N-1})A^*)=K$.

Reference is now made to FIGS. 12–15, which help to further illustrate the downlink channel in a multiple beam system and an exemplary graphical depiction of a complementary beam forming process (described in greater detail in the next Section).

Figure 12:
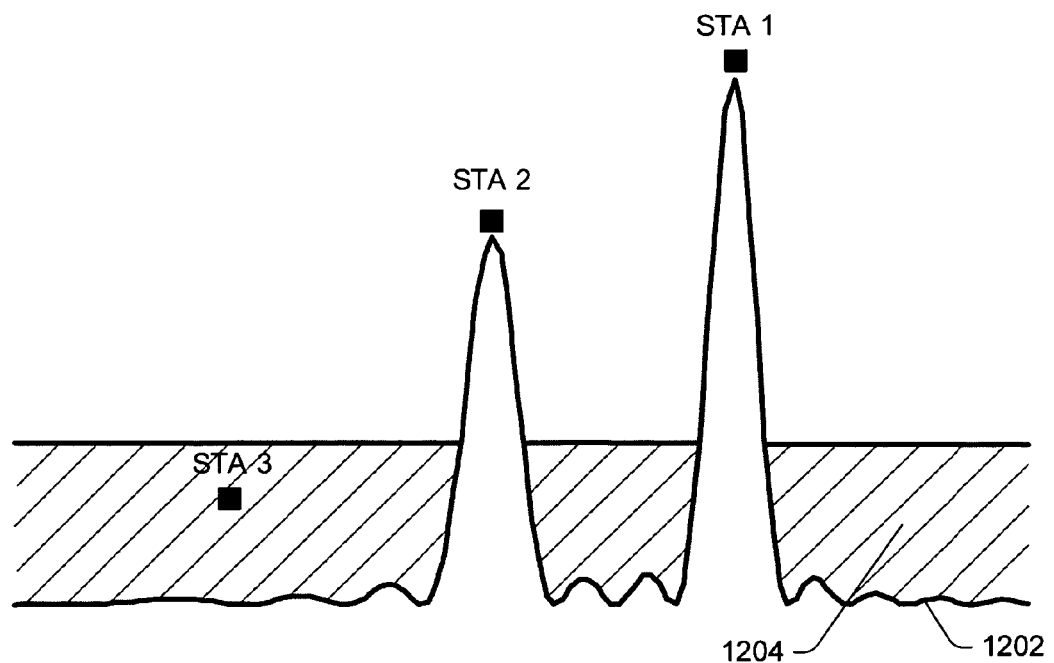
FIGS. 12–15 are illustrative diagrams showing certain features of a downlink beam pattern, in accordance with certain exemplary implementations of the present invention.

FIG. 12 shows an ideal complementary beamforming example, wherein line 1202 illustrates the transmit beams to Sta 1 and Sta 2, and area 1204 illustrates the coverage area of the complementary beam, in which Sta 3 is included. As such, Sta 3 will be able to determine that the downlink channel is busy. The complementary beam may, for example, carry the same data as the beams to STA 1 or 2 or both, independent data, Preamble, CTS, or other like data.

Figure 13:
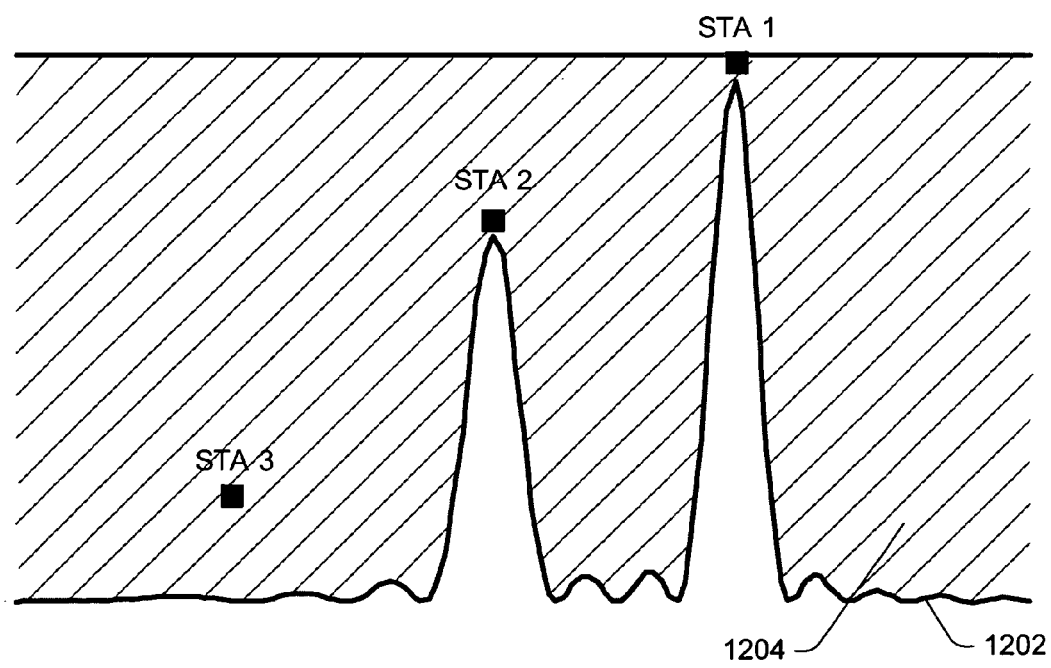
Figure 14:
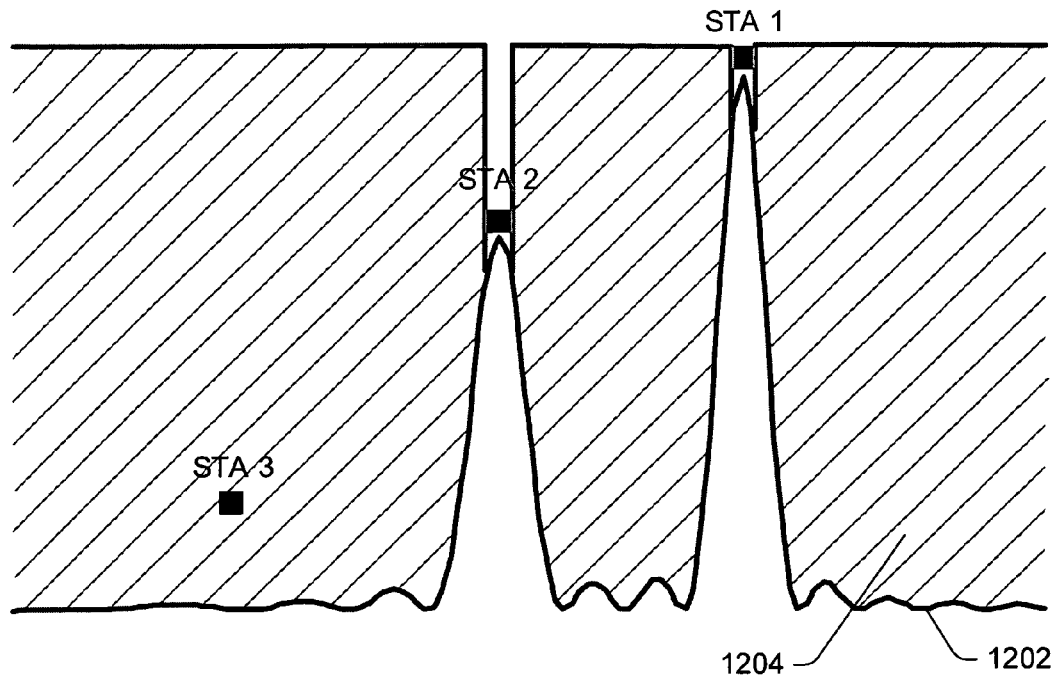
Figure 15:
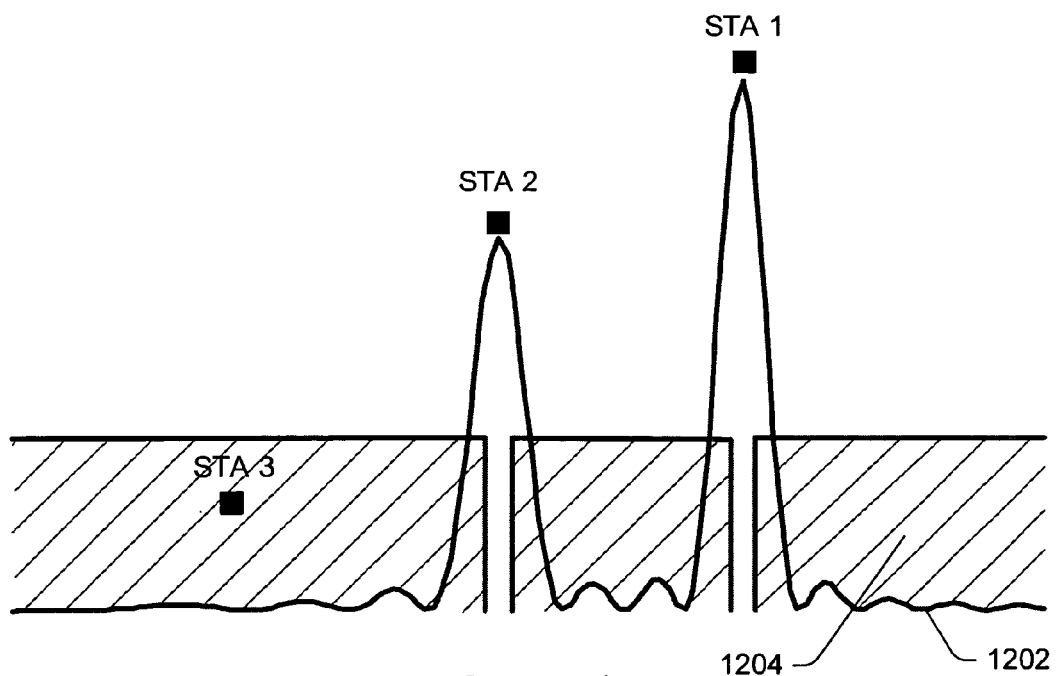

FIGS. 13–15 graphically show how a complementary beam in this example may be formed. In FIG. 13, the first step is develop an omnipattern, such as $\tilde{z}(\theta)=z(\theta)+z^c(\theta)=\|a^T(\theta)W\|^2+\|a^T(\theta)W^c\|^2=C_0$. Next, as shown in FIG. 14, nulls are developed at the DOAs for Sta 1 and Sta 2. For example, $\tilde{z}(\theta)=z(\theta)+z^c(\theta)=\|a^T(\theta)W\|^2+\|a^T(\theta)W^c\|^2$. Then, as illustrated in FIG. 15, the complementary beam power is scaled appropriately. For example, $\tilde{z}(\theta)=z(\theta)+k_0 z^c(\theta)=\|a^T(\theta)W\|^2+k_0\|a^T(\theta)W^c\|^2$.

Section 5: Subspace Complementary Beamforming (SCBF)

In this Section, "Subspace Complementary Beamforming" (SCBF) is described. Here, by using dummy independent data streams additional energy is radiated in the directions of side lobe so that user stations in the hidden beam can detect the channel activity. As with earlier exemplary schemes, the SCBF technique does not significantly interfere with intended user stations.

The downlink beam pattern of user k is defined as follows $$z_k(\theta)=|a^T(\theta)w_k|^2,\ 0\leq\theta\leq\pi$$

By assuming each client's data is independent, the total beam pattern of K downlink signals can be written as $$z(\theta) = \sum_{k=1}^{K} |a^T(\theta)w_k|^2 = \|a^T(\theta)W\|^2$$

where $W=[w_1\ w_2\ \ldots\ w_K]$ represents the weight matrix. The total beam will have K main beams. The complementary beam can be generated by either modifying the weight matrix or expanding the weight matrix to larger matrix. In this Section we will take the latter approach. In general designing arbitrary shape of the beam is difficult problem, e.g., as illustrated in FIGS. 12–15. It might be impossible because of the limited degree of freedom.

Figure 35:
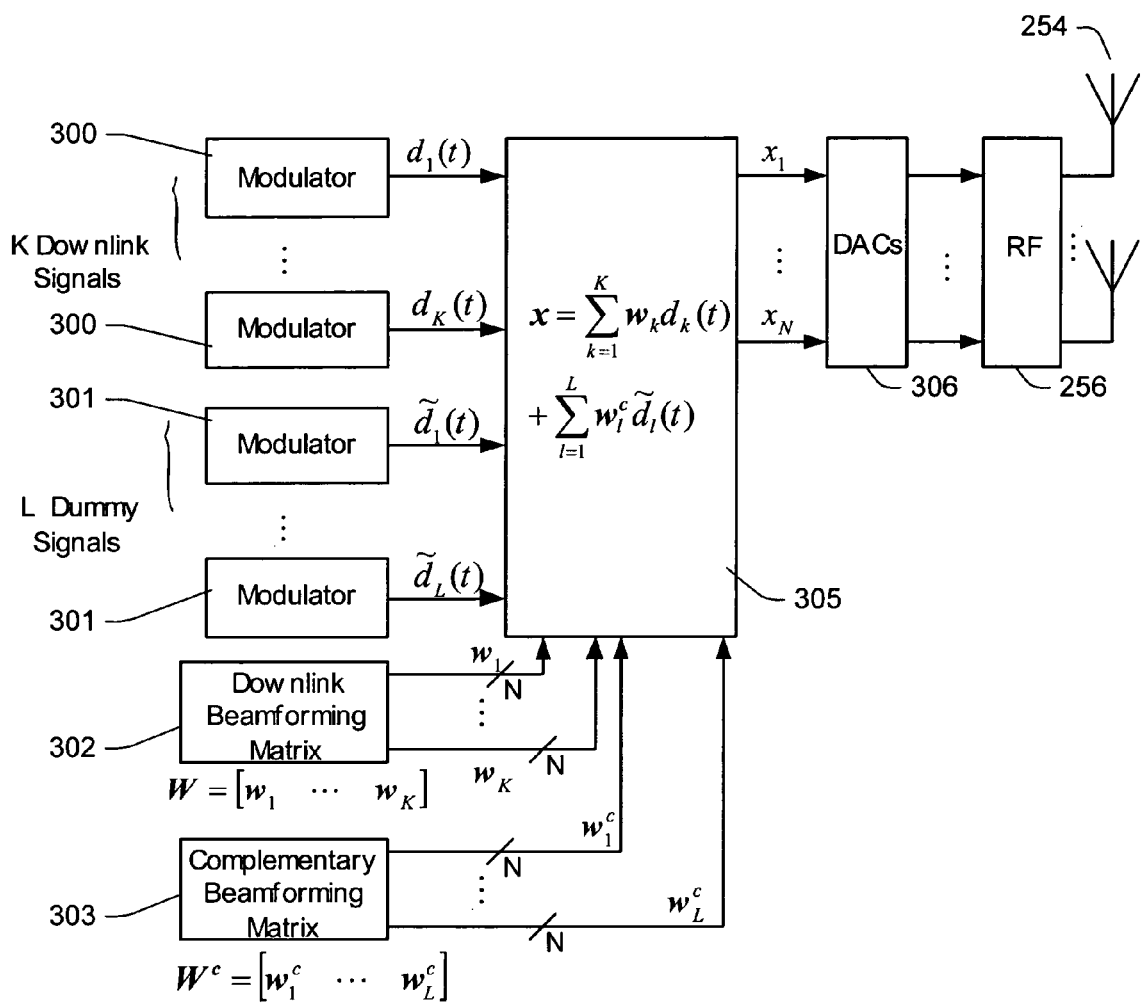
FIG. 35 is a block diagram depicting an improved base station that performs subspace complementary beamforming, in accordance with certain exemplary implementations of the present invention.

Before describing the exemplary SCBF or SCBF II implementations in greater mathematical detail, reference is first made to FIG. 35, which is a block diagram illustrating certain features of an SCBF or SCBF II beamforming transmitter. Here, a plurality (K) of modulators 300 provide $d_1(t), d_2(t), \ldots, d_K(t)$ modulated signals to a beamforming and vector sum function 305. Also, a plurality (L) of modulators 301 provide $\tilde{d}_1(t), \tilde{d}_2(t), \ldots, \tilde{d}_L(t)$ modulated dummy signals to beamforming and vector sum function 305. A downlink beamforming matrix function 302 provides vectors $W=[w_1,\ldots,w_K]$ to beamforming and vector sum function 305. Also, a complementary beamforming matrix function 303 provides vectors $W^c=[w_1^c,\ldots,w_K^c]$ to beamforming and vector sum function 305. In beamforming and vector sum function 305, $x_1,\ldots,x_K$ digital signals are generated based on $$x = \sum_{k=1}^{K} w_k d_k(t) + \sum_{l=1}^{L} w_l^c \tilde{d}_l(t).$$

Digital signals $x_1, \ldots, x_K$ are then each provided to a corresponding digital-to-analog converter (DAC) 306. The resulting analog signals $x_1, \ldots, x_K$ are then provided to an RF function 256 and corresponding $y_1, \ldots, y_K$ RF signals are provided to corresponding elements in array antenna 254.

Certain exemplary design approaches include a three step design. First generate omnidirectional beam using additional independent data streams. Second, in order to avoid any interference create nulls at intended user's DOAs. Third, control the complementary beam power.

5.1 Generate Omnipattern

The objective is to generate the complementary beam which makes the total beam pattern to be omnidirectional. Define the complementary beam pattern $z^c(\theta)$ as $$z^c(\theta) = \sum_{k=1}^{L} |a^T(\theta) w_k^c|^2 = \|a^T(\theta) W^c\|^2$$

where $W^c = [w_1^c \, w_2^c \, \ldots \, w_L^c]$ is a weight matrix for the generation of the complementary beam. The complementary weight matrix $W^c$ should be chosen in the way that the radiated power is constant over entire angles. That is $$\tilde{z}(\theta) = z(\theta) + z^c(\theta) = \|a^T(\theta) W\|^2 + \|a^T(\theta) W^c\|^2 = \text{const.}, 0 \leq \theta < \pi \quad (17)$$

Note the complementary beam introduces additional interference with the amount of $\|a^T(\theta) W^c\|^2$ to the user located at angle $\theta$ even with orthogonality between $w_k$ and $w_1^c$ for any k and l.

Defining $\tilde{W} = [W \, W^c]$, the $\tilde{z}(\theta)$ can be rewritten as $$\tilde{z}(\theta) = \|a^T(\theta) \tilde{W}\|^2 = a^T(\theta) D a^*(\theta) = C_0, \, 0 \leq \theta < \pi$$

where $D = \tilde{W} \tilde{W}^H = W W^H + W^c W^{cH}$ and $C_0$ is the constant power level.

Note for the omnidirectional beam pattern the matrix $D = \tilde{W} \tilde{W}^H$ should be a diagonal matrix with power constraint $\text{Tr}\{\tilde{W} \tilde{W}^H\} = C_0$. It is of interest whether there exists a complementary weight matrix $W^c$ and if exists whether it is unique. If $C^0$ is greater than a certain threshold which depends on the peak value of the beam, there will be a solution. If there exists a solution, there will be multiple solutions since the constraint (17) considers only the signal power.

Giving a singular value decomposition to W $$W = U \Lambda V^H,$$

where $$\Lambda = \begin{bmatrix} \lambda_1 & 0 & \cdots & 0 \\ 0 & \lambda_2 & \ddots & \vdots \\ \vdots & & \ddots & 0 \\ 0 & \cdots & 0 & \lambda_K \\ 0 & \cdots & \cdots & 0 \\ \vdots & & & \vdots \\ 0 & \cdots & \cdots & 0 \end{bmatrix}$$

is the singular matrix, U and V are unitary matrices, one can rewrite D as $$D = U \Lambda \Lambda^H U^H + W^c W^{cH}$$

One needs to find a matrix $W^c$ which makes the matrix D to be a diagonal matrix with $\text{Tr}\{D\} = C_0$. If it is assumed that matrix $W^c W^{cH}$ has the following special structure $$W^c W^{cH} = U \Lambda^c \Lambda^{cH} U^H$$

then D becomes $$D = U(\Lambda \Lambda^H + \Lambda^c \Lambda^{cH}) U^H$$

In this particular case, if and only if the matrix $\Lambda \Lambda^H + \Lambda^c \Lambda^{cH}$ is an identity matrix with a scalar $c_0$, D becomes a diagonal matrix i.e. $D = c_0 I$. With a power constraint set by $C_0$ one can find the singular values $\lambda_k^c$'s of $\Lambda^c$ which satisfy following equations:

$$|\lambda_k|^2 + |\lambda_k^c|^2 = c_0, \, 1 \leq k \leq N$$

and $$N c_0 = C_0$$

where $\lambda_k = 0$ is assumed for $K < k \leq N$.

Figure 11:
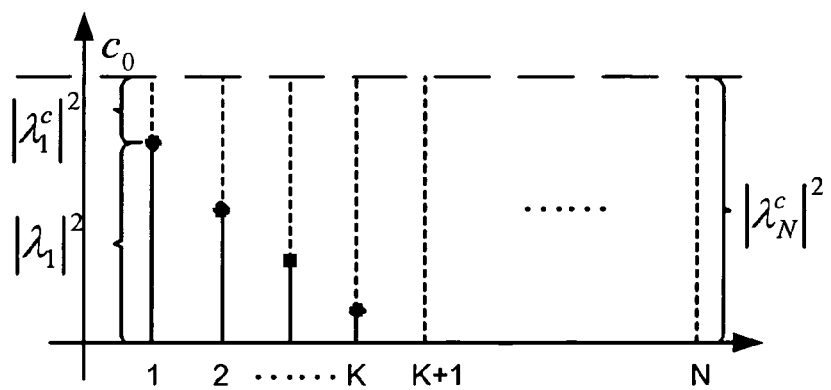
FIG. 11 is an illustrative diagram showing a singular value distribution associated with subspace complementary beamforming, in accordance with certain exemplary implementations of the present invention.

Clearly, $c_0$ should be greater than or equal to $\max(|\lambda_k|^2)$. FIG. 11 depicts a singular value distribution example.

The complementary weight matrix $W^c$ is as follows $$W^c = U \Lambda^c V^{cH}$$

where $V^{cH}$ is any unitary matrix. Obviously, there are multiple solutions even in this special case. For simplicity, assume an identity matrix for the unitary matrix. Then, $$W^c = U \Lambda^c \quad (18)$$

which generates the complementary beam pattern for the omnidirectional beam.

5.2 Generate Nulls

To generate nulls at each user's DOA, the following condition should be satisfied $$a^T(\theta_k) w_l^c = 0, \, 1 \leq k \leq K \text{ and } 1 \leq l \leq L.$$

The inner product $\langle a^*(\theta_k), w_l^c \rangle$ should be zero for all k and l. Then, one achieves $z^c(\theta_k) = 0$ for all k.

Denote S the subspace spanned by vectors $a^*(\theta_k)$ and $S^\perp$ the orthogonal complement subspace of S. Now decompose $w_l^c$ into two orthogonal components, one lies in S and the other lies in $S^\perp$ as follows $$w_l^c = P_S w_l^c + P_{S^\perp} w_l^c,$$

where $P_S$ and $P_{S^\perp}$, are projection matrices to S and $S^\perp$, respectively and defined by $$P_S = A^* (A^T A^*)^{-1} A^T \text{ and } P_{S^\perp} = I - P_S.$$

In the scattering channel, the projection matrices are defined by $$P_S = H^* (H^T H^*)^{-1} H^T \text{ and } P_{S^\perp} = I - P_S.$$

Clearly, $P_{S^\perp} w_l^c$ will not generate any power to the intended users. Then, the complementary weight matrix can be obtained by applying the orthogonal projection to (18)

$$W^c = (I - P_S) U \Lambda^c.$$

Giving SVD to $A^* = \tilde{U}\tilde{\Lambda}\tilde{V}^H$ (in scattering channel $H^* = \tilde{U}\tilde{\Lambda}\tilde{V}^H$), the complementary weight matrix becomes $$W^c = \left(\sum_{l=K+1}^{N} \tilde{u}_l \tilde{u}_l^H\right) U\Lambda^c$$

where $\tilde{u}_l$ is the l-th column vector of $\tilde{U}$.

Certainly, the projection technique can be applied to the downlink beamforming to generate nulls at other user's DOAs.

Theorem 3: rank($W^c$)=N−K or N−K−1 and, if the downlink beamforming matrix has a special form W=A*B where B is a non-singular K-by-K matrix, the complementary weight matrix degenerates to $W^c = \sqrt{c_0}[u_{K+1}\ u_{K+2}\ \ldots\ u_N]$ where $W = U\Lambda V^H$ is assumed.

Proof: Obviously, the rank of $P_{S^\perp}$ is N−K. The rank of $U\Lambda^c$ is N or N−1 depending on the value of $c_0$. Using following property rank($A$)+rank($B$)−N ≤ rank($AB$) ≤ min(rank($A$), rank($B$))

where N is number of columns of A or number of rows of B, since K≥1, the rank of $W^c = P_{S^\perp} U\Lambda^c$ is N−K or N−K−1.

Define S' as the subspace spanned by columns of W. Since W=A*B and B is a non-singular matrix, the matrices W and A* are column-equivalent. Hence, the space S and S' are identical. See, e.g., Dennis B. Ames, *Fundamentals of Linear Algebra*, International Textbook Company, 1970.

Note the projection matrix $P_{S'}$ is equal to $P_S$ because $$P_{S'} = A^*B(B^H A^T A^* B)^{-1} B^H A^T = A^*(A^T A^*)^{-1} A^T = P_S.$$

The projection matrices for S' and S'$^\perp$ are $$P_{S'} = W(W^H W)^{-1} W^H = U \begin{bmatrix} I_{K \times K} & 0_{K \times (N-K)} \\ 0_{(N-K) \times K} & 0_{(N-K) \times (N-K)} \end{bmatrix} U^H$$

and $$I - P_{S'} = \sum_{l=K+1}^{N} u_l u_l^H = U \begin{bmatrix} 0_{K \times K} & 0_{K \times (N-K)} \\ 0_{(N-K) \times K} & I_{(N-K) \times (N-K)} \end{bmatrix} U^H,$$

respectively.

The complementary weight matrix can be written as $$W^c = (I - P_S) U\Lambda^c = (I - P_{S'}) U\Lambda^c = \sqrt{c_0}\, U \begin{bmatrix} 0_{K \times K} & 0_{K \times (N-K)} \\ 0_{(N-K) \times K} & I_{(N-K) \times (N-K)} \end{bmatrix}.$$

Since the first K columns of $W^c$ are zero vectors, the complementary weight matrix can degenerate to $$W^c = \sqrt{c_0}[u_{K+1} u_{K+2} \ldots u_N].$$

Since the pseudoinverse or MF beamforming matrix satisfy the above condition, the complementary weight matrix can be obtained through SVD to W. On the other hand the windowed MF does not satisfy the above condition and since $W^c$ is an N-by-N matrix, though its rank is N−K at most, one needs to create N independent data streams. However, using SVD to $W^c$ $$W^c = \left(\sum_{l=K+1}^{N} \tilde{u}_l \tilde{u}_l^H\right) U\Lambda^c = \bar{U}\bar{\Lambda}\bar{V}^H,$$

and the fact that the rank of $W^c$ is N−K if rank($\Lambda^c$)=N, the complementary weight matrix degenerates to $$W^c = [\bar{\lambda}_1 \bar{u}_1 \bar{\lambda}_2 \bar{u}_2 \ldots \bar{\lambda}_{N-K} \bar{u}_{N-K}].$$

Note the column vectors in $W^c$ have different weights. This makes the overall beam pattern to be omnidirectional. Since one can scale the complementary beam power level, the overall beam power at the directions of the side lobe cannot be flat. Instead of trying to make the overall beam to be flat, a flat complementary beam is enough. Changing $W^c$ to $$W^c = \sqrt{c_0}[\bar{u}_1 \bar{u}_2 \ldots \bar{u}_{N-K}] \quad (19)$$

will not generate severe ripple as far as the ripple of W is small because the beam pattern of $W^c$ (19) will have constant level at the hidden beam angles.

5.3 Scale

Since the total beam does not have to be omnidirectional for the hidden beam problem, the power level of the complementary beam should be lowered by adjusting $k_0$. For example, Non-windowed downlink beam: $W^c = \sqrt{k_0 c_0}[u_{K+1}\ u_{K+2}\ \ldots\ u_N]$ Windowed downlink beam: $W^c = \sqrt{k_0 c_0}[\bar{u}_1\ \bar{u}_2\ \ldots\ \bar{u}_{N-K}]$.

The side lobe power of the complementary beam is 10 $\log_{10} C_0 + 10 \log_{10} k_0$ where $C_0 = Nc_0$ is the level of the main lobe.

5.4 Exemplary Subspace Complementary Beamforming II (SCBF II) Technique

Now assume 2K<N and introduce augmented matrix $W_a$ $$W_a = [W A^*].$$

In the scattering channel we define the augmented matrix as $$W_a = [W\ H^*].$$

The rank r of $W_a$ is in the range of K to 2K. The vectors orthogonal to $W_a$ can generate another complementary beam. Through SVD, one can have SCBF II as follows $$W_a^c = \sqrt{c_0}[u_{a,r+1} u_{a,r+2} \ldots u_{a,N}]$$

where $u_{a,l}$ is the l-th left singular vector whose corresponding singular value is zero. In the windowed downlink beamforming the rank of $W^c$ is N−2K. This means the number of additional independent data streams required is smaller than that of SCBF and smaller transmitted power is required for the same level of complementary beam. However, because of less degree of freedom for the creation of the complementary beam, more ripple in the complementary beam is observed.

Theorem 4: If the downlink beamforming matrix has a special form W=A*B where B is a non-singular K-by-K matrix, the SCBF II and SCBF yield identical beam patterns.

Proof: The augmented matrix $W_a$ can be written as $$W_a = [A^*B\ A^*] = A^*[B\ I] = U_a \Lambda_a V_a^H.$$

Note the rank r of $W_a$ is K. The complementary weight matrix of the SCBF II is given by $$W_a^c = \sqrt{c_0}[u_{a,K+1} u_{a,K+2} \ldots u_{a,N}].$$

Apparently, $W_a^{cH}W_a=0$. This leads to $W_a^{cH}W=0$.

Remember that the columns of $W^c$ of the SCBF are also orthogonal to columns of W, $$W^{cH}W=0.$$

It can be observed that the matrices $W_a^c$ and $W^c$ have the same column spaces with bases $u_{a,K+1}, \ldots, u_{a,N}$ and $u_{K+1}, \ldots, u_N$, respectively. Hence, the matrices $W_a^c$ and $W^c$ are column-equivalent. Thus, there exists a non-singular square matrix Q satisfying following identity $$W^c = W_a^c Q.$$

Since $u_{a,k}$ and $u_k$ are orthonormal bases, the matrix Q should be unitary.

The beam pattern generated by $W^c$ can be written as $$z^c(\theta)=\|a^T(\theta)W^c\|^2=\|a^T(\theta)W_a^cQ\|^2=a^T(\theta)W_a^c \cdot QQ^HW_a^{cH}a^*(\theta)=\|a^T(\theta)W_a^c\|^2.$$

Thus, $$\|a^T(\theta)W^c\|^2=\|a^T(\theta)W_a^c\|^2.$$

5.5 Null Widening Technique

Until now the ideal DOA estimation has been assumed. In reality, however, since there will likely be a DOA estimation error, this causes a severe SIR penalty. In order to reduce the sensitivity to the DOA estimation error one can generate one or more additional nulls at vicinity of DOA's. This can be obtained by changing the steering matrix A. For example, the steering vector $a(\theta_k)$ may be replaced with $$\tilde{a}(\theta_k)=[a(\theta_k-\Delta\theta_l)a(\theta_k)a(\theta_k+\Delta\theta_r)].$$

The new steering matrix for the projection becomes $$\tilde{A}=[\tilde{a}(\theta_1)\tilde{a}(\theta_2)\ldots\tilde{a}(\theta_K)].$$

The projection using the above steering matrix will generate nulls at not only $\theta_k$ but also $\theta_k-\Delta\theta_l$ and $\theta_k+\Delta\theta_r$. The optimum number and positions of additional nulls will depend on the N, K, DOA estimation error and antenna array structure (i.e. steering vector). The null widening technique creates wider nulls if $\theta_k-\Delta\theta_l$ and $\theta_k+\Delta\theta_r$ are chosen properly. Unfortunately, however, one may not be able to generate as many nulls as are needed. If the rank of $\tilde{A}$ is equal to N, the projection matrix becomes $P_S=I$.

Thus, $P_S^\perp=0$.

This means that one cannot generate any complementary beam when the rank of $\tilde{A}$ is equal to N. Thus, there is a limitation on the number of additional nulls. The total number of nulls should be less than N. Note that in certain implementations, the null widening technique is applied to the downlink beamforming also to reduce side lobe level or create wider nulls at other intended user's DOAs.

This exemplary null widening technique is useful in non-zero angular and delay spread channels when the downlink beamforming matrix is calculated assuming free space channel. The complementary beam or side lobe of intended user's main beam may cause interference to other intended user's main beam in multipath channels though they have deep nulls. Thus, wider nulls are more desirable in multipath channels in order to reduce the chance of the interference to all intended users. Furthermore, the complementary beam level may be controlled adaptively based on the channel environments.

5.6 Simulations

Here, pseudoinverse downlink beamforming is considered with four active users and N=16 in the ULA 254 with $d=\lambda/2$. The channel condition is summarized in Table 1, below. The downlink beam patterns of users are shown in graph 1600 in FIG. 16.

TABLE 1

| | Channel condition | |
|---|---|---|
| | DOA (deg) | Relative Power $20\log|h_k|$ |
| User1 | 40 | 0 dB |
| User2 | 90 | −20 dB |
| User3 | 100 | −30 dB |
| User4 | 140 | −50 dB |

Figure 16:
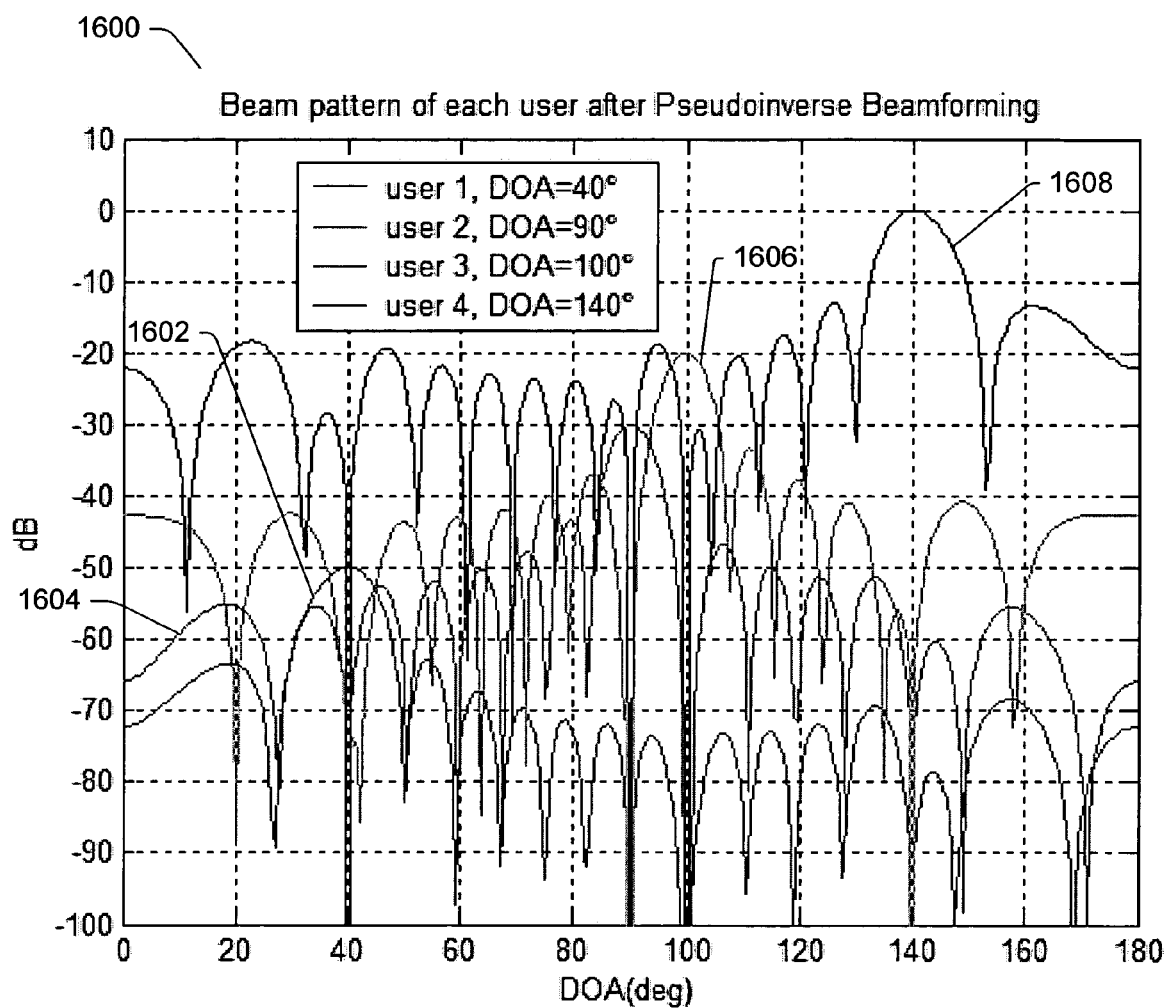
FIG. 16 is a graph depicting a beam pattern for certain users after pseudoinverse beamforming, in accordance with certain exemplary implementations of the present invention.
Figure 17:
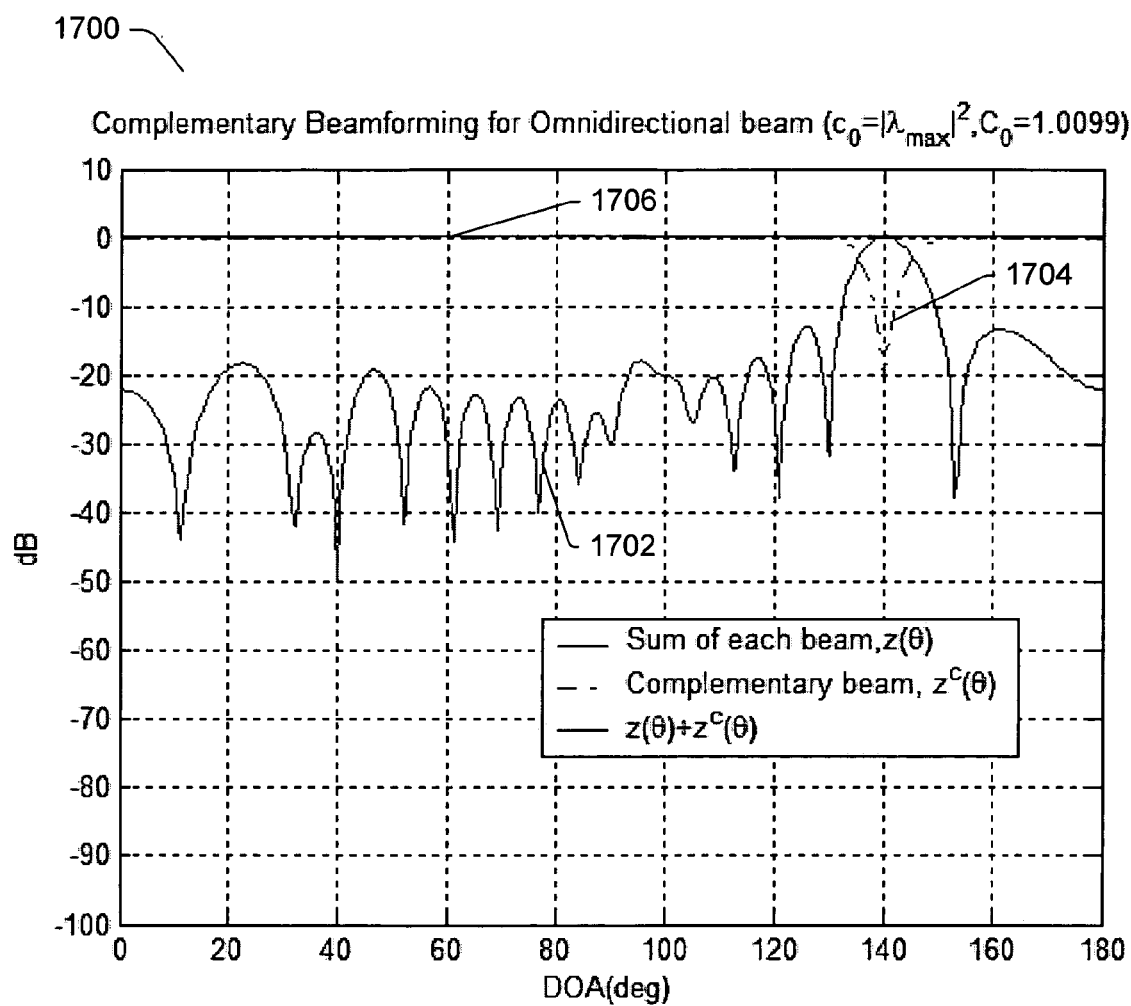
FIG. 17 is a graph depicting a beam pattern of complementary beamforming, in accordance with certain exemplary implementations of the present invention.

In FIG. 16, graph 1600 depicts the beam patterns for each of the user's beams, where user 1 is represented by line 1602, user 2 is represented by line 1604, user 3 is represented by line 1606, and user 4 is represented by line 1608. Graph 1700 in FIG. 17 depicts the sum of each user's beam (line 1702), complementary beam $z^c(\theta)$ (line 1704), and $z(\theta)+z^c(\theta)$ (line 1706). The complementary beam makes the resulting output to be omnidirectional. However, since the complementary beam does not generate nulls at each user's DOA, each client will experience low SIR. By generating nulls at the intended user's DOA, the complementary beam does not interfere with any other beams.

Figure 18:
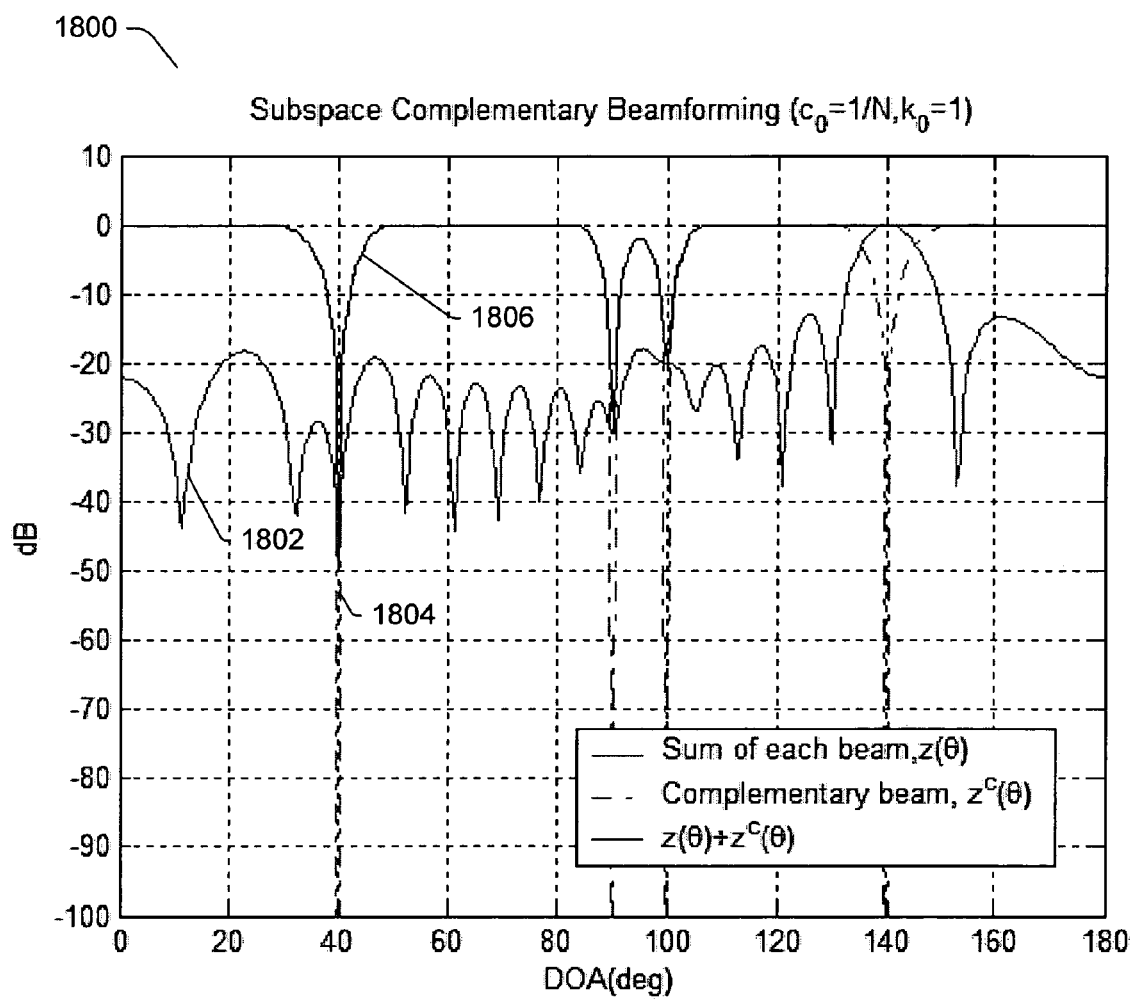
FIGS. 18–19 are graphs depicting beam patterns of subspace complementary beamforming, in accordance with certain exemplary implementations of the present invention.
Figure 19:
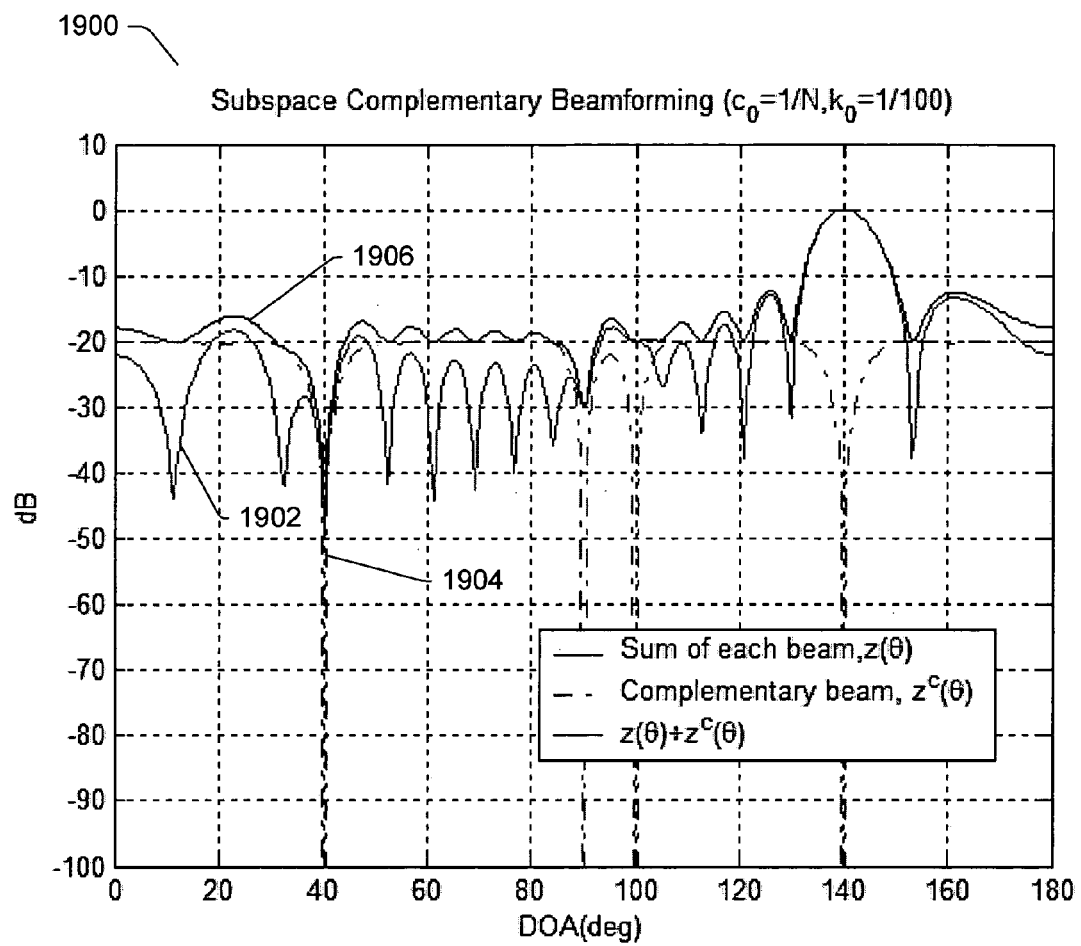

As shown in graph 1800 of FIG. 18, the complementary beam (line 1804) has nulls at each user's DOA. Also shown are the sum of each beam (line 1802) and $z(\theta)+z^c(\theta)$ (line 1806). Additionally, in graph 1900 of FIG. 19, by setting $k_0$ to 0.01, the power of the complementary beam (line 1904) is reduced by 20 dB. One can expect the SIR to remain at infinity due to the generation of nulls. Also shown are the sum of each beam (line 1902) and $z(\theta)+z^c(\theta)$ (line 1906).

Figure 20:
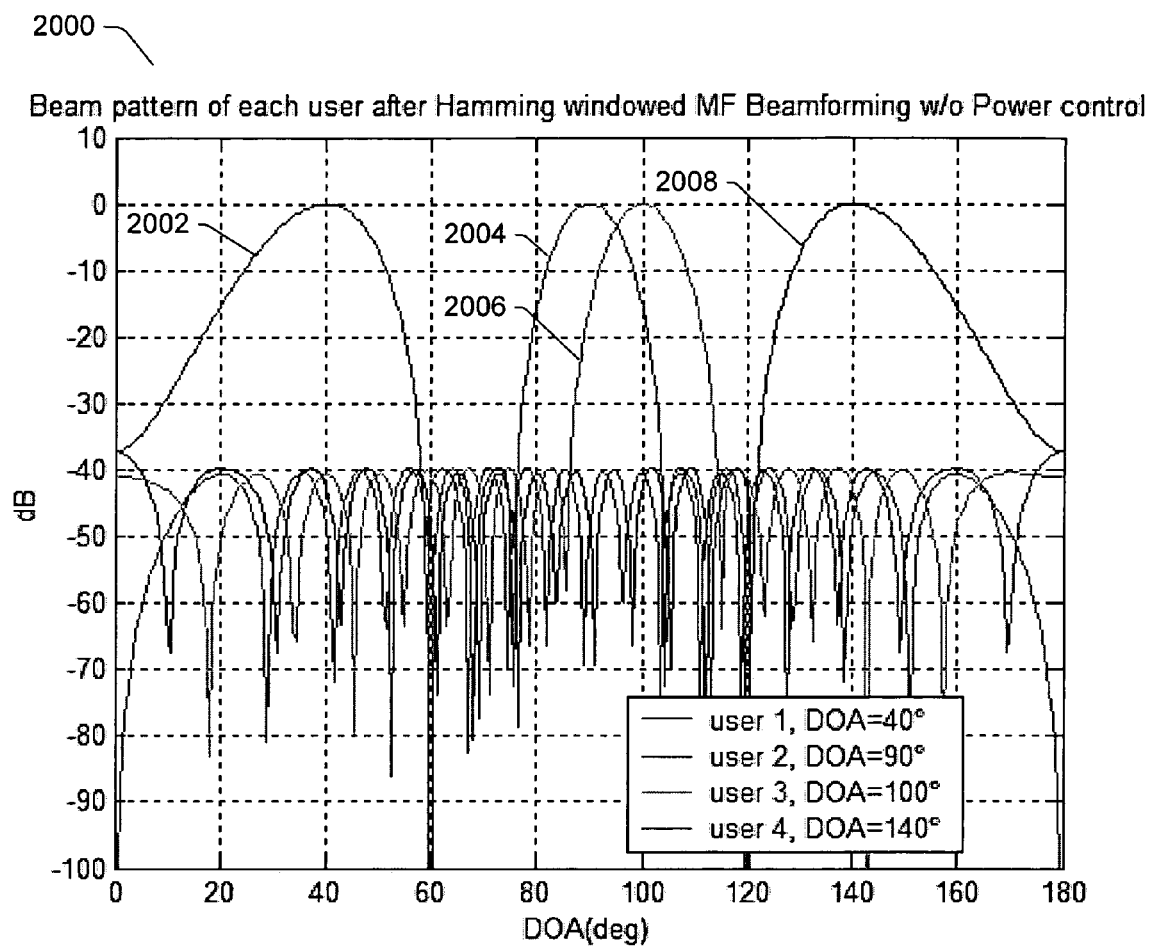
FIG. 20 is a graph depicting a beam pattern for certain users after Hamming windowed MF beamforming without power control, in accordance with certain exemplary implementations of the present invention.
Figure 21:
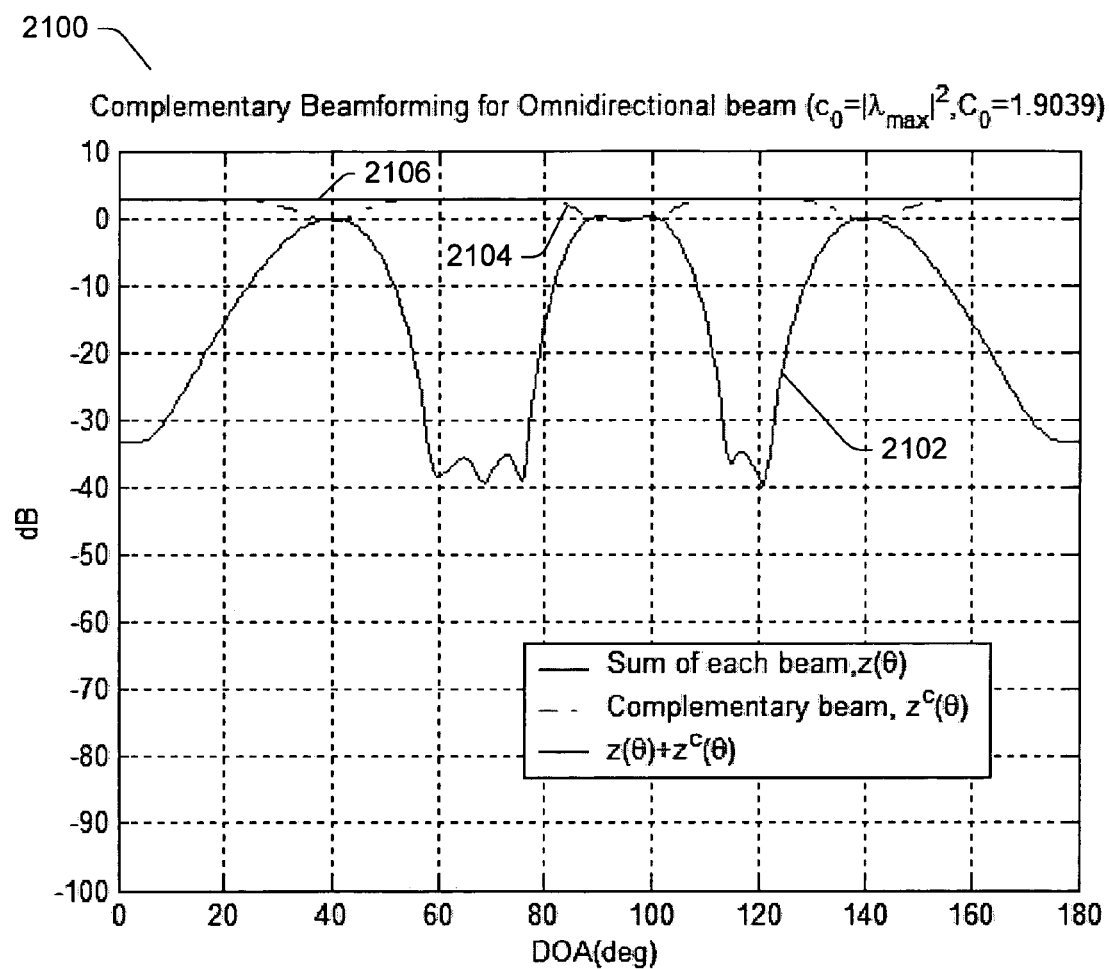
FIG. 21 is a graph depicting a beam pattern of complementary beamforming, in accordance with certain exemplary implementations of the present invention.

Next, consider the Hamming windowed MF beamforming without power control. The beam patterns of each user are shown in graph 2000 of FIG. 20, where user 1 is represented by line 2002, user 2 is represented by line 2004, user 3 is represented by line 2006, and user 4 is represented by line 2008. In graph 2100 of FIG. 21, the complementary beam (line 2104) is depicted. Note the sum $\tilde{z}(\theta)=z(\theta)+z^c(\theta)$ (line 2106) is greater than the maximum of $z(\theta)$ (line 2102). This means that the complementary beam will introduce non-zero interference power to users.

For the omnidirectional radiated power the $c_0$ should be greater than or equal to max $(|\lambda_k|^2)$. Then, the radiated power has the relation $$C_0=Nc_0 \geq N \max(|\lambda_k|^2).$$

Figure 22:
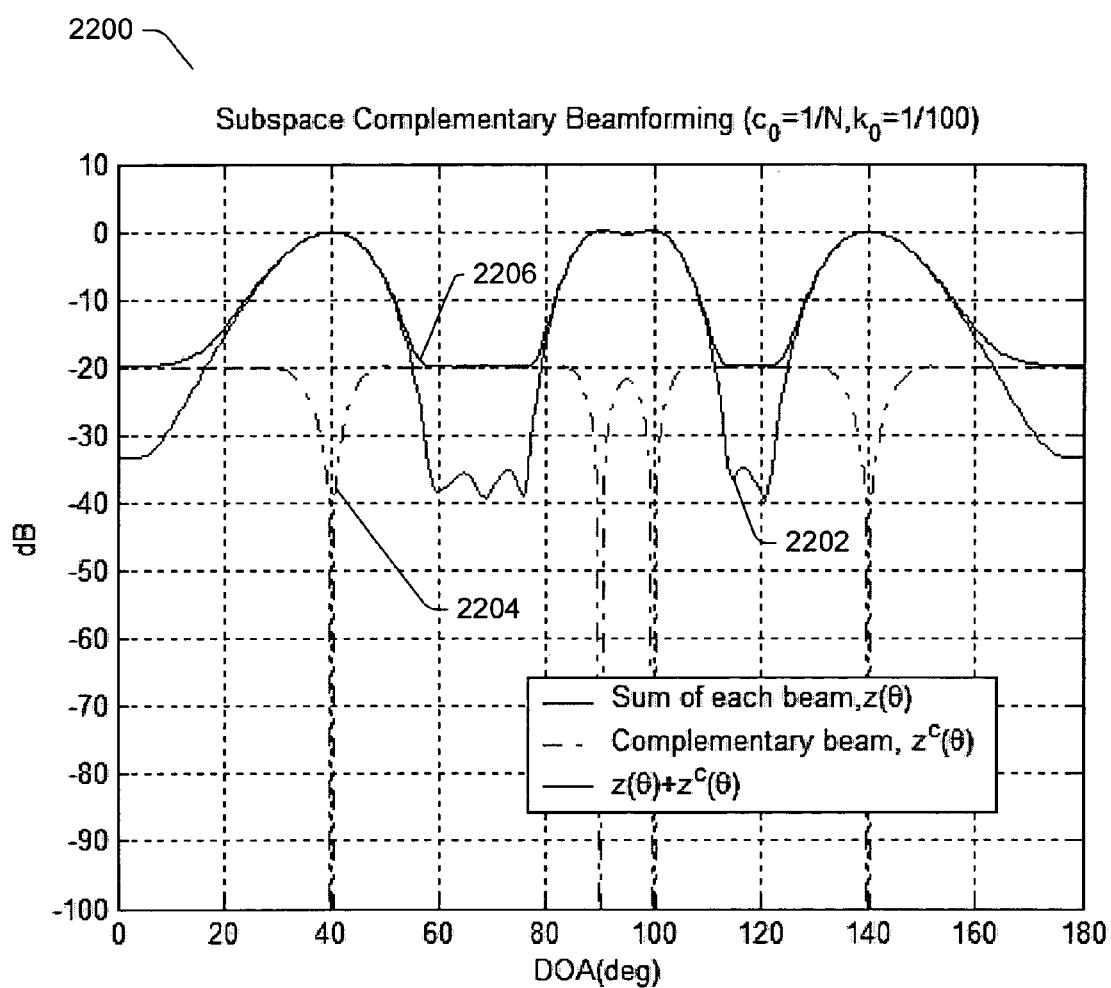
FIGS. 22–24 are graphs depicting further beam patterns of subspace complementary beamforming, in accordance with certain exemplary implementations of the present invention.

If $C_0 > z(\theta)$, then the complementary beam's interference to users at $\theta$ is $C_0-z(\theta)$. However, the complementary beam (2204) does not generate any interference to the directions of intended user's DOAs as depicted through the projection shown in graph 2200 of FIG. 22. Also shown here are the sum of each beam (line 2202) and $z(\theta)+z^c(\theta)$ (line 2206).

Figure 23:
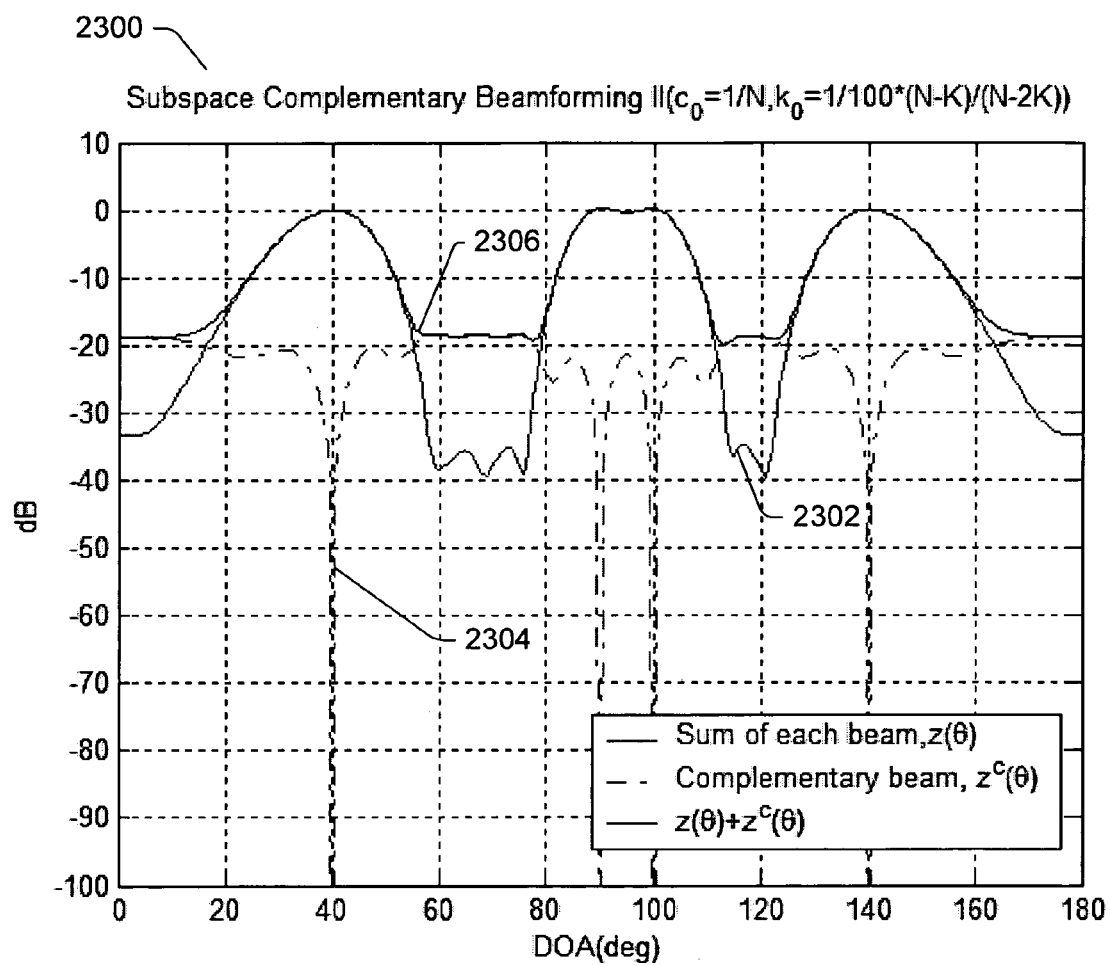

In graph 2300 of FIG. 23 the beam of the SCBF II (line 2304) is illustrated when it is applied to the windowed MF downlink beam. One can notice there is a ripple at the complementary beam itself. Under the same transmitted power condition the complementary beam exhibits higher level. Also shown here are the sum of each beam (line 2302) and $z(\theta)+z^c(\theta)$ (line 2306).

Figure 24:
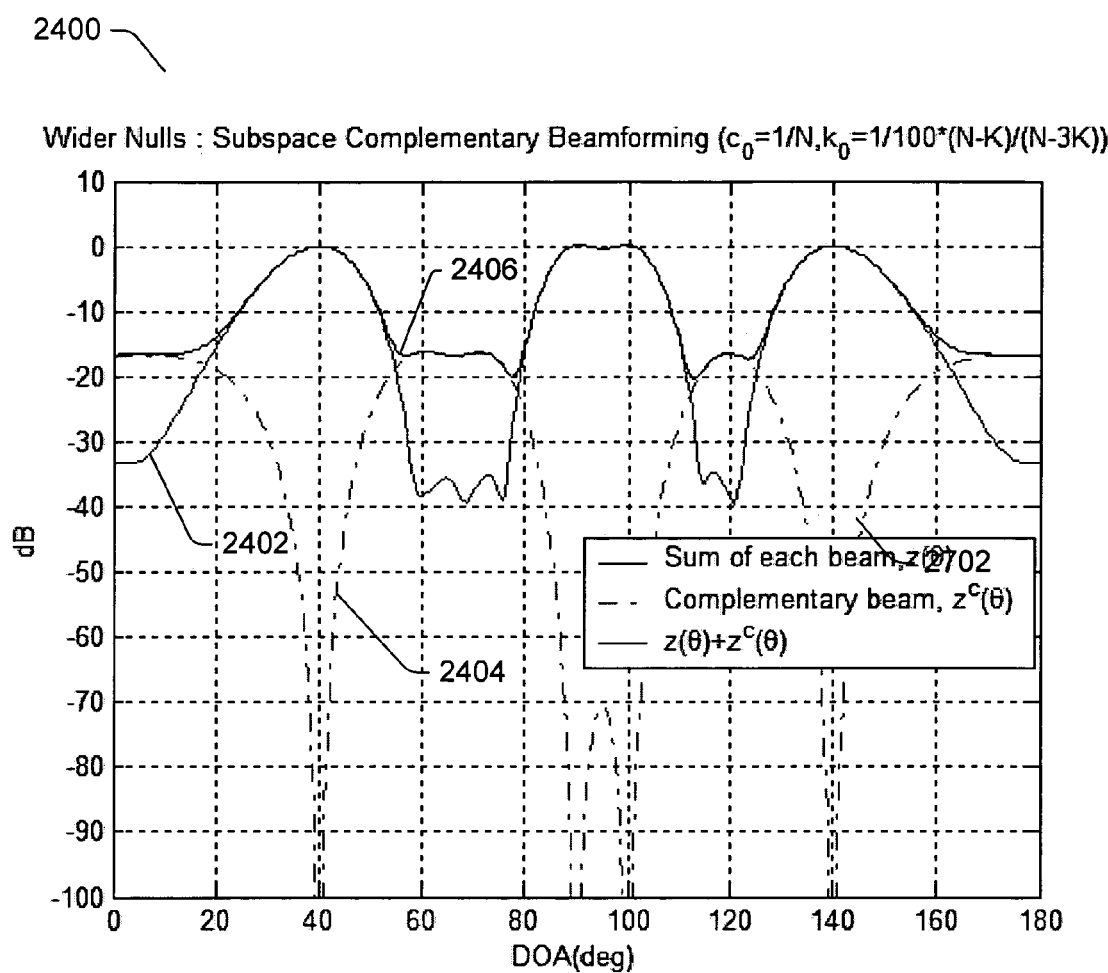

Graph 2400 in FIG. 24 shows the effect of an exemplary null widening technique. Depicted are the complementary beam (line 2404) the sum of each beam (line 2402) and $z(\theta)+z^c(\theta)$ (line 2406). The additional nulls are set to $\theta_k-\Delta\theta_l=\theta_k-0.5°$, and $\theta_k+\Delta\theta_r=\theta_k+0.5°$. As such, for example, one can achieve 29 dB suppression at $\theta_k\pm5°$.

Section 6: Complementary Superposition Beamforming (CSBF)

In this Section "Complementary Superposition Beamforming" (CSBF) techniques are described. In CSBF the side lobe level of any one of main beams is increased in order for the hidden beam clients not only to detect some power but, in some cases, to decode the data packet as well.

In the subspace complementary beamforming one needs to generate N–K dummy random data streams. The SIR of each dummy data is too low to decode because N independent data streams are transmitted at hidden beam angles. Through the SCBF the hidden beam clients can decide the channel is busy by detecting some energy but cannot decode the data. If the hidden beam clients can decode and extract important information such as CTS and preamble, etc., the hidden beam problem would be more controllable.

6.1 Complementary Superposition Beamforming (CSBF)

Instead of sending additional random data, CSBF increases the side lobe power of one of main beams which has the highest side lobe level so that the hidden beam users are able to not only detect some energy but also decode the data packet. CSBF is created, for example, by modifying one column vector of W as follows $$\tilde{W}=[w_1 \ldots w_{k-1}\tilde{w}_k w_{k+1} \ldots w_K],$$

where $$\tilde{w}_k = p_0 w_k + \sum_{l=1}^{N-K} p_l w_l^c.$$

One decision is how to choose $p_l$. One may start with the K=1 case. The downlink weight matrix can be written as $$W=U\Lambda V^H=\lambda_1 u_1=W_1,$$

because $$\Lambda = \begin{bmatrix} \lambda_1 \\ 0 \\ \vdots \\ 0 \end{bmatrix}$$

and V=1.

Then, SCBF provides $W^c=\sqrt{c_0}[u_2\ u_3\ \ldots\ u_N]$.

The modified weight vector $\tilde{w}_1$ becomes $$\tilde{w}_1=[\lambda_1 u_1 \sqrt{c_0}u_2 \ldots \sqrt{c_0}u_N]p,$$

where $p=[p_0\ p_1\ \ldots\ p_{N-1}]^T$. The weight vector $\tilde{w}_1$ can be decomposed by two vectors as $$\tilde{w}_1=(\lambda_1-\sqrt{c_0})u_1p_0+[\sqrt{c_0}u_1\sqrt{c_0}u_2 \ldots \sqrt{c_0}u_N]p.$$

If the vector p is chosen as a complex conjugate transpose of l-th row of U, the weight vector can be expressed as $$\tilde{w}_1=(\lambda_1-\sqrt{c_0})u_1p_0+\sqrt{c_0}[0 \ldots 010 \ldots ]^T. \quad (20)$$

The second vector in (20) has only one non-zero element at l-th antenna. This means the second vector produces omnidirectional beam pattern. The beam pattern becomes equation (21) as shown below:

$$z(\theta) = |a^T\tilde{w}_1|^2 =$$

$$\left|\frac{(\lambda_1-\sqrt{c_0})p_0}{\lambda_1}\right|^2 |a^T w_1|^2 + 2\frac{(\lambda_1-\sqrt{c_0})\sqrt{c_0}}{\lambda_1} Re\{p_0 a^T w_1 a_1^*\}+c_0$$

The omnibeam pattern caused by the second vector in (20) increases the side lobe of $w_1$ though there is a ripple because of the cross term in (21). Note when $\sqrt{c_0}=\lambda_1$ the beam becomes omnidirectional. Through the scale one can control the side lobe level. Here, one can expect more ripple in the beam compared to the SCBF method. This larger ripple comes from the less degree of freedom in the CSBF.

This argument can be extended to general cases as follows. First choose the k-th beam which has highest side lobe level. Then, change the k-th weight vector to $$\tilde{w}_k=p_0 w_k+W^c p$$

where p is complex conjugate transpose of the l-th row of $W^c$, $$p_0 = \frac{w_{k,l}^*}{|w_{k,l}|}$$

is normalized complex conjugate of the i-th element of $w_k$, and $W^c$ is given by either the SCBF or SCBF II. Note the increased side lobe beam of the k-th beam still does not interfere with other intended users, resulting in no loss of SIR's of intended users.

Figure 25:
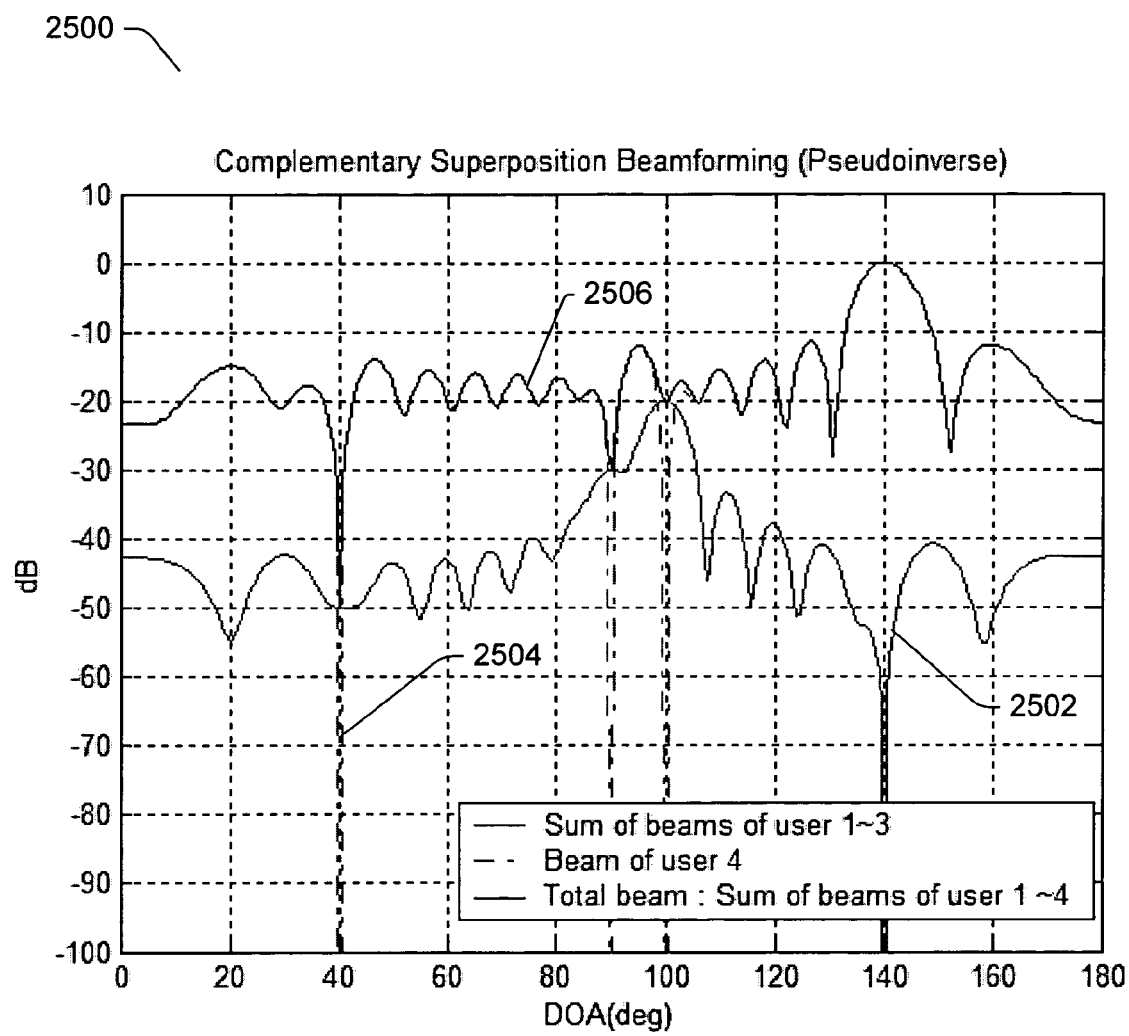
FIG. 25 is a graph depicting a beam pattern of complementary superposition beamforming, in accordance with certain exemplary implementations of the present invention.

With reference to graph 2500 of FIG. 25, when the CSBF technique is applied to the pseudoinverse method the beam patterns are depicted. Here, the sum of beams of users 1–3 is represented by line 2502, the beam of user 4 is represented by line 2504, and the sum of beams of users 1–4 is represented by line 2506. Since the user 4 has the highest side lobe level, the weight vector of user 4 is modified. The SIR improvement over the entire angle is noticeable while making nulls at other user's DOA.

Figure 26:
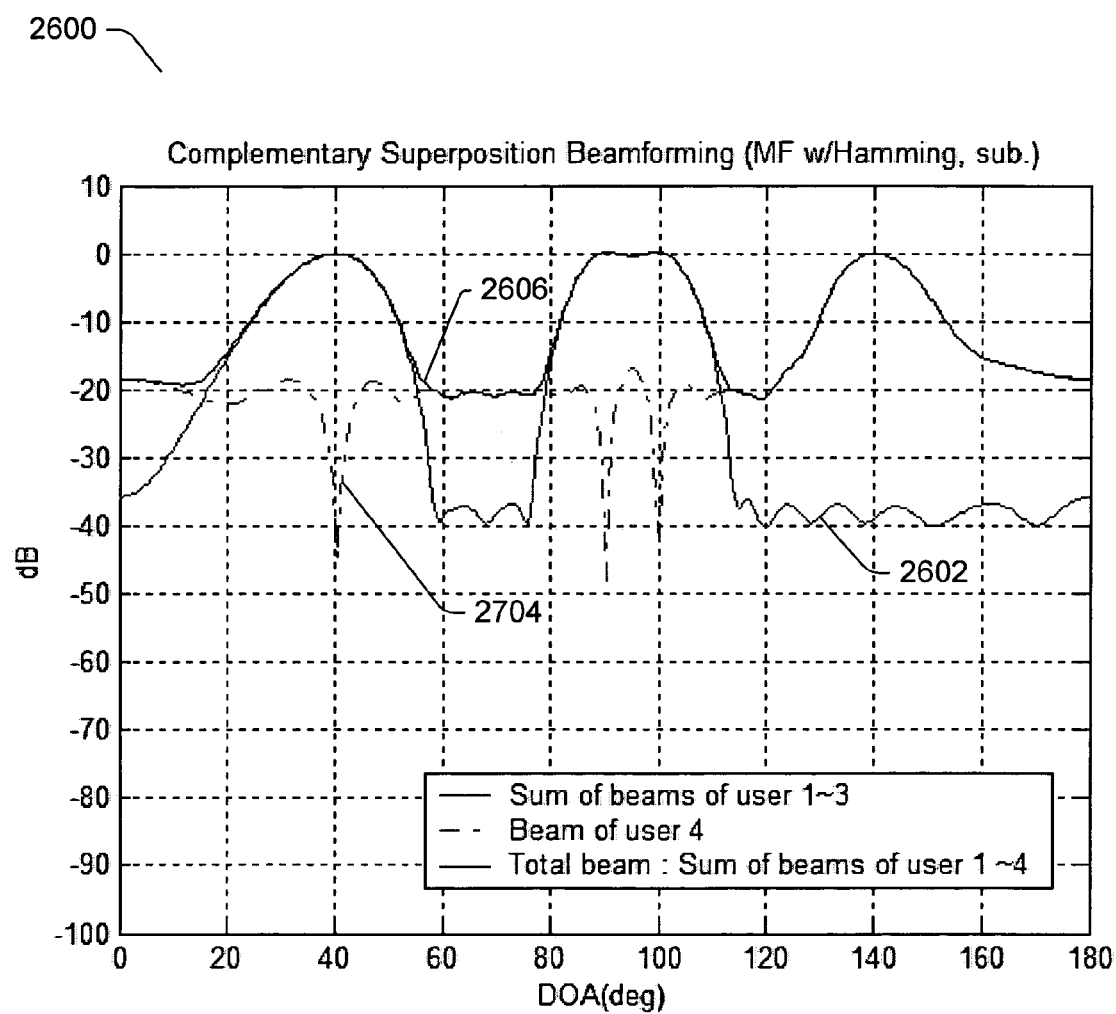
FIGS. 26–30 are graphs depicting further beam patterns of complementary superposition beamforming, in accordance with certain exemplary implementations of the present invention.

Exemplary beam patterns of the windowed MF with the CSBF are depicted in graph 2600 of FIG. 26. Here, the sum of beams of users 1–3 is represented by line 2602, the beam of user 4 is represented by line 2604, and the sum of beams of users 1–4 is represented by line 2606. Note that the nulls of beam 4 are not as deep because the Hamming windowed MF itself does not generate nulls. However, adopting the null generation technique to the downlink beam, one can create significantly deep nulls.

Figure 27:
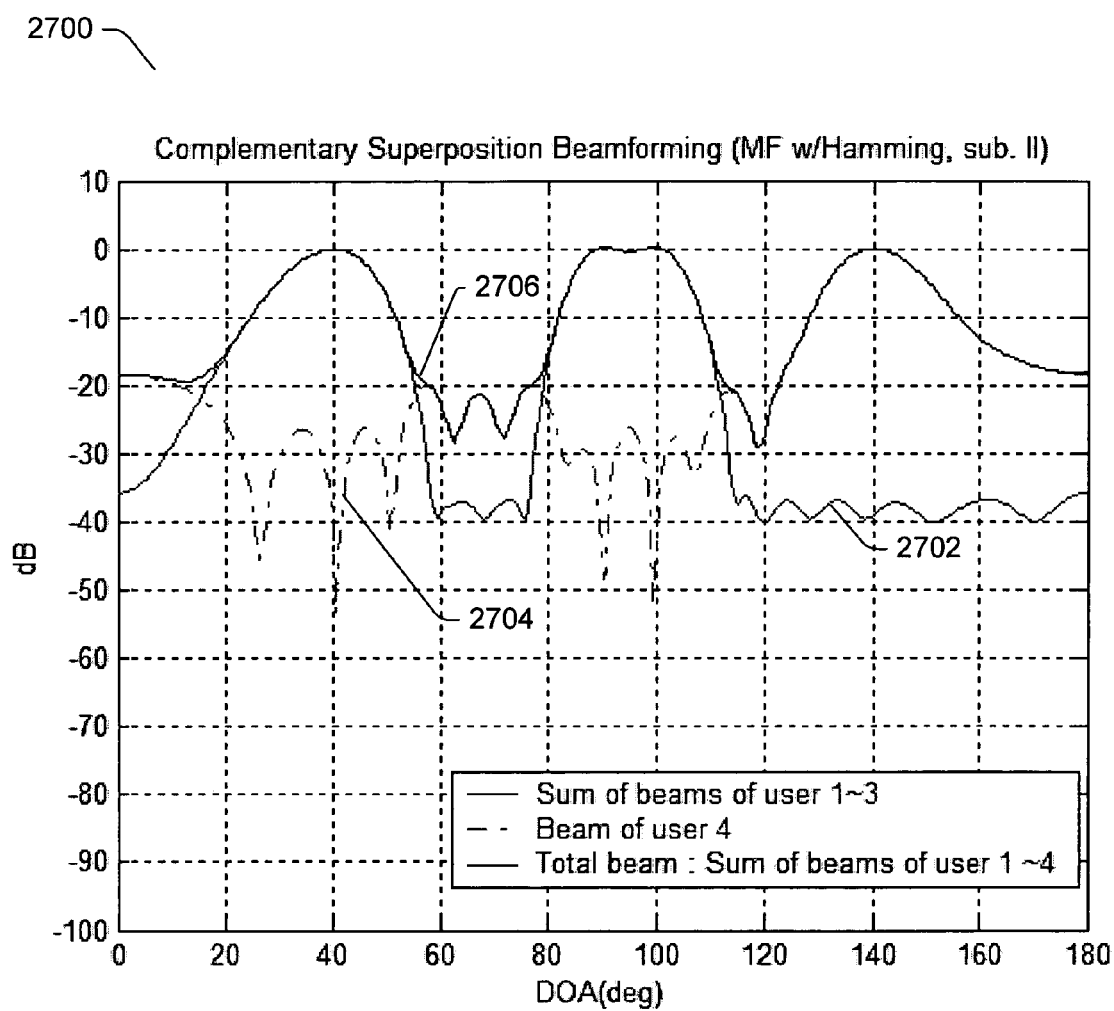

Graph 2700 in FIG. 27 depicts beam patterns when the SCBF II method is used to generate the CSBF weight matrix. Here, the sum of beams of users 1–3 is represented by line 2702, the beam of user 4 is represented by line 2704, and the sum of beams of users 1–4 is represented by line 2706. One can notice more ripple in the beam of user 4 (line 2704). This higher ripple comes from the less degree of freedom of the SCBF II technique.

Figure 36:
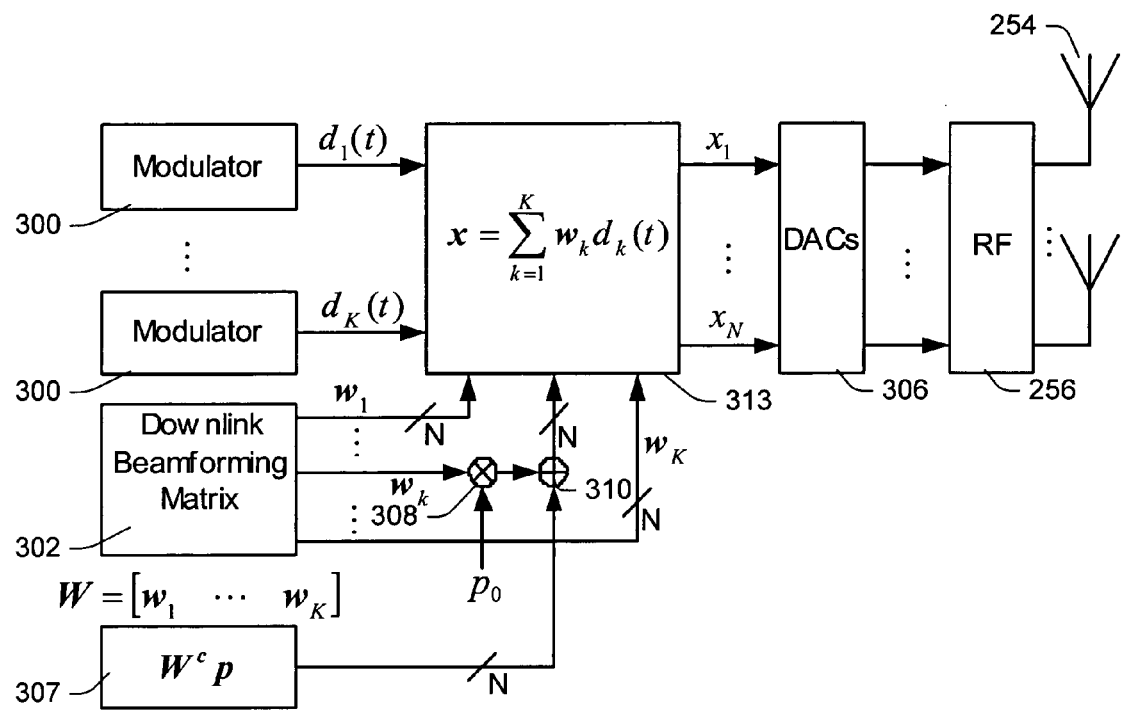
FIGS. 36 and 37 are block diagrams depicting portions of an improved base station that performs complementary superposition beamforming, in accordance with certain exemplary implementations of the present invention.

Reference is now made to FIG. 36, which is a block diagram illustrating certain features of an exemplary CSBF beamforming transmitter. Here, a plurality (K) of modulators 300 provide $d_1(t), d_2(t), \ldots, d_K(t)$ modulated signals to a beamforming and vector sum function 309. A downlink beamforming matrix function 302 provides vectors $W=[w_1, \ldots, w_k, \ldots, w_K]$ to beamforming and vector sum function 309, with vector $w_k$ being modified at multiplier 308 by $p_0$ and the results being added via adder 310 to vector $W^c p$ 307. In beamforming and vector sum function 309, $x_1, \ldots, x_K$ digital signals are generated based on $$x = \sum_{k=1}^{K} w_k d_k(t).$$

Digital signals $x_1, \ldots, x_K$ are then each provided to a corresponding digital-to-analog converter (DAC) 306. The resulting analog signals $x_1, \ldots, x_K$ are then provided to an RF function 256 and corresponding $y_1, \ldots, y_K$ RF signals are provided to corresponding elements in array antenna 254.

6.2 Complementary Superposition Beamforming II (CSBF II)

If all user's side lobe levels are low enough, one can set up additional channel to send special data to the hidden beam users. This special channel can carry control data only such as CTS, preamble, etc. From the previous subsection, the following weight matrix is devised $$\tilde{W} = \left[ w_1 w_2 \cdots w_K \sum_{l=1}^{N-K} p_l w_l^c \right].$$

Figure 28:
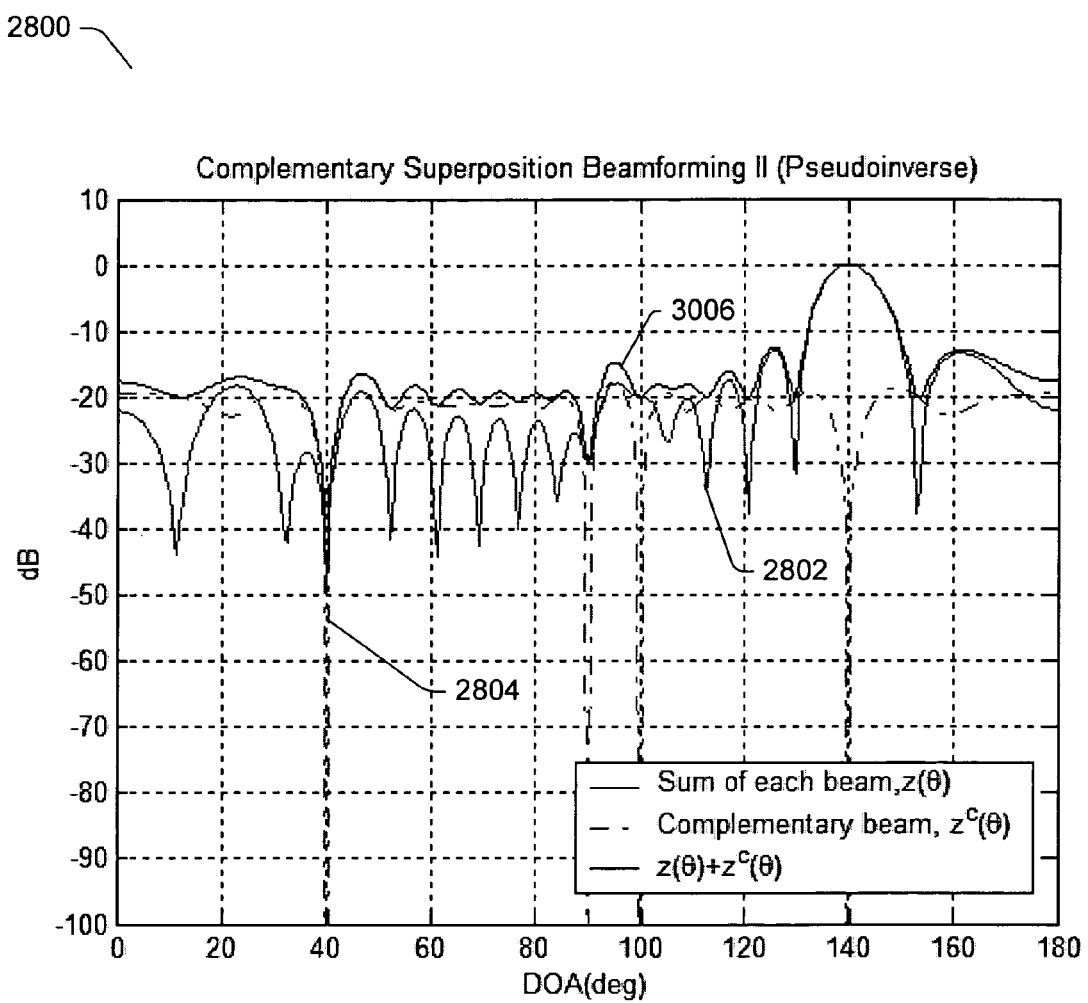

Graph 2800 in FIG. 28 depicts CSBF II beams. Here, the sum of each beam is represented by line 2802, the complementary beam is represented by line 2804, and the $z(\theta) + z^c(\theta)$ is represented by line 2806.

Figure 29:
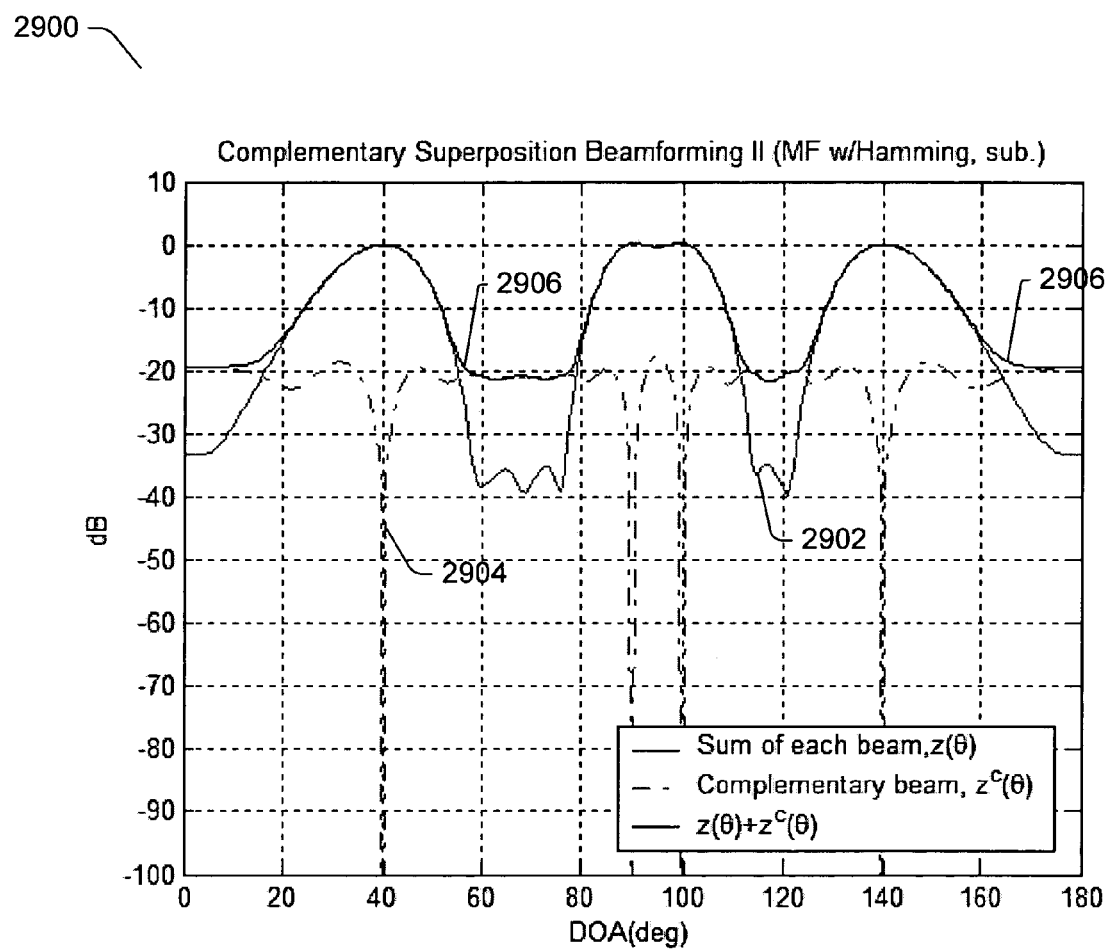

Graph 2900 in FIG. 29 depicts CSBF II beams with Hamming windowed MF (sub I). Here, the sum of each beam is represented by line 2902, the complementary beam is represented by line 2904, and the $z(\theta) + z^c(\theta)$ is represented by line 2906.

Figure 30:
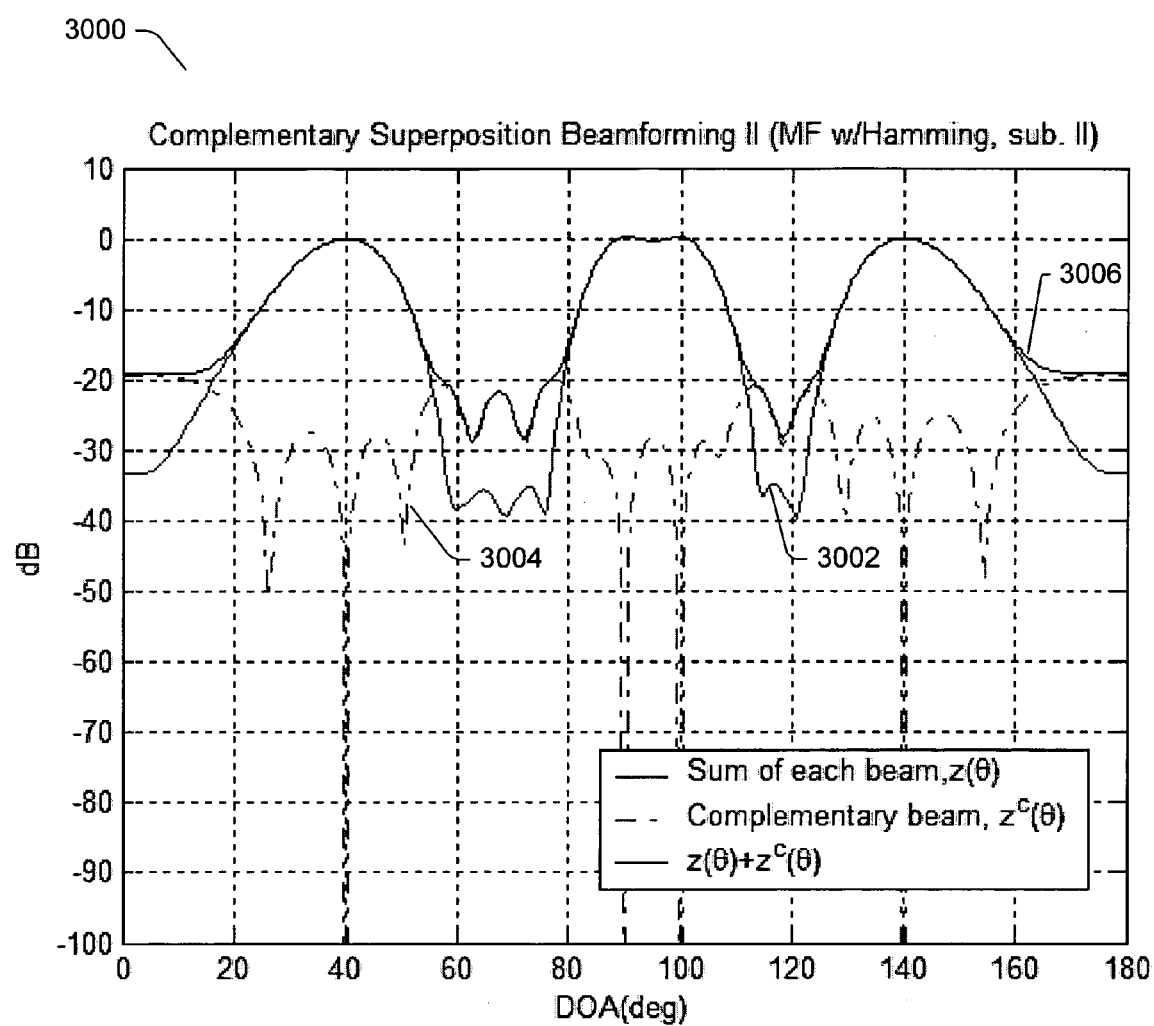

Graph 3000 in FIG. 30 depicts CSBF II beams with Hamming windowed MF (sub II). Here, the sum of each beam is represented by line 3002, the complementary beam is represented by line 3004, and the $z(\theta) + z^c(\theta)$ is represented by line 3006.

Figure 37:
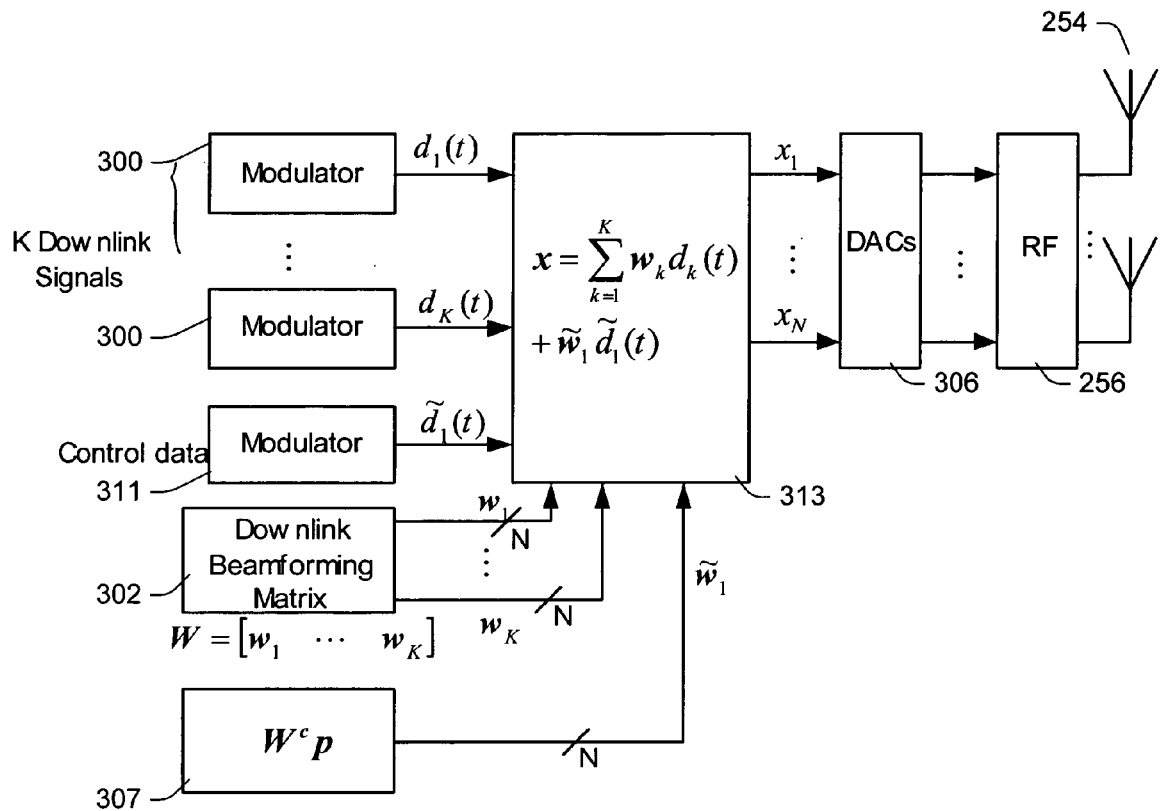

Reference is now made to FIG. 37, which is a block diagram illustrating certain features of an exemplary CSBF II beamforming transmitter. Here, a plurality (K) of modulators 300 provide $d_1(t), d_2(t), \ldots, d_K(t)$ modulated signals to a beamforming and vector sum function 313. A modulator 311 provides control data as $\tilde{d}_1(t)$ to beamforming and vector sum function 313. A downlink beamforming matrix function 302 provides vectors $W = [w_1, \ldots, w_K]$ to beamforming and vector sum function 313. From vector $W^c p$ 307, $\tilde{w}_1$ is provided to beamforming and vector sum function 313. In beamforming and vector sum function 313, $x_1, \ldots, x_K$ digital signals are generated based on $$x = \sum_{k=1}^{K} w_k d_k(t) + \tilde{w}_1 \tilde{d}_1(t).$$

Digital signals $x_1, \ldots, x_K$ are then each provided to a corresponding digital-to-analog converter (DAC) 306. The resulting analog signals $x_1, \ldots, x_K$ are then provided to an RF function 256 and corresponding $y_1, \ldots, y_K$ RF signals are provided to corresponding elements in array antenna 254.

6.3 Performance of CBF

Through the complementary beamforming techniques onen put some energy to the hidden beam directions in order for the hidden beam users to detect or decode data. n this subsection the probability that the hidden beam users can detect or decode data is investigated. The hidden beam problem is usually worst when only one beam is transmitted. When K=1, one can use a MF downlink beam. Thus, CSBF yields $$W = (1-\varepsilon)a_1 \frac{a^*(\theta)}{a^H a} + [0 \cdots 0_\varepsilon 0 \cdots 0]^T.$$

Note when $\epsilon=0$, W becomes the MF downlink beam and when $\epsilon=1$, the beam pattern becomes omnidirectional. To see how much improvement can be achieved using the complementary beamformings the following parameters are defined:

(i) $SNR_{Req}$: required SNR for particular data rate (ii) $SNR_{CCA}$: SNR for hidden users to decide the channel is busy or decode data packets (iii) Coverage area for the particular data rate: where $SNR \geq SNR_{Req}$ (iv) $Prob(SNR \geq SNR_{CCA})$: the probability that SNR in the coverage area is equal to or greater than $SNR_{CCA}$ (v) $\Delta = SNR_{Req} - SNR_{CCA}$.

Figure 31:
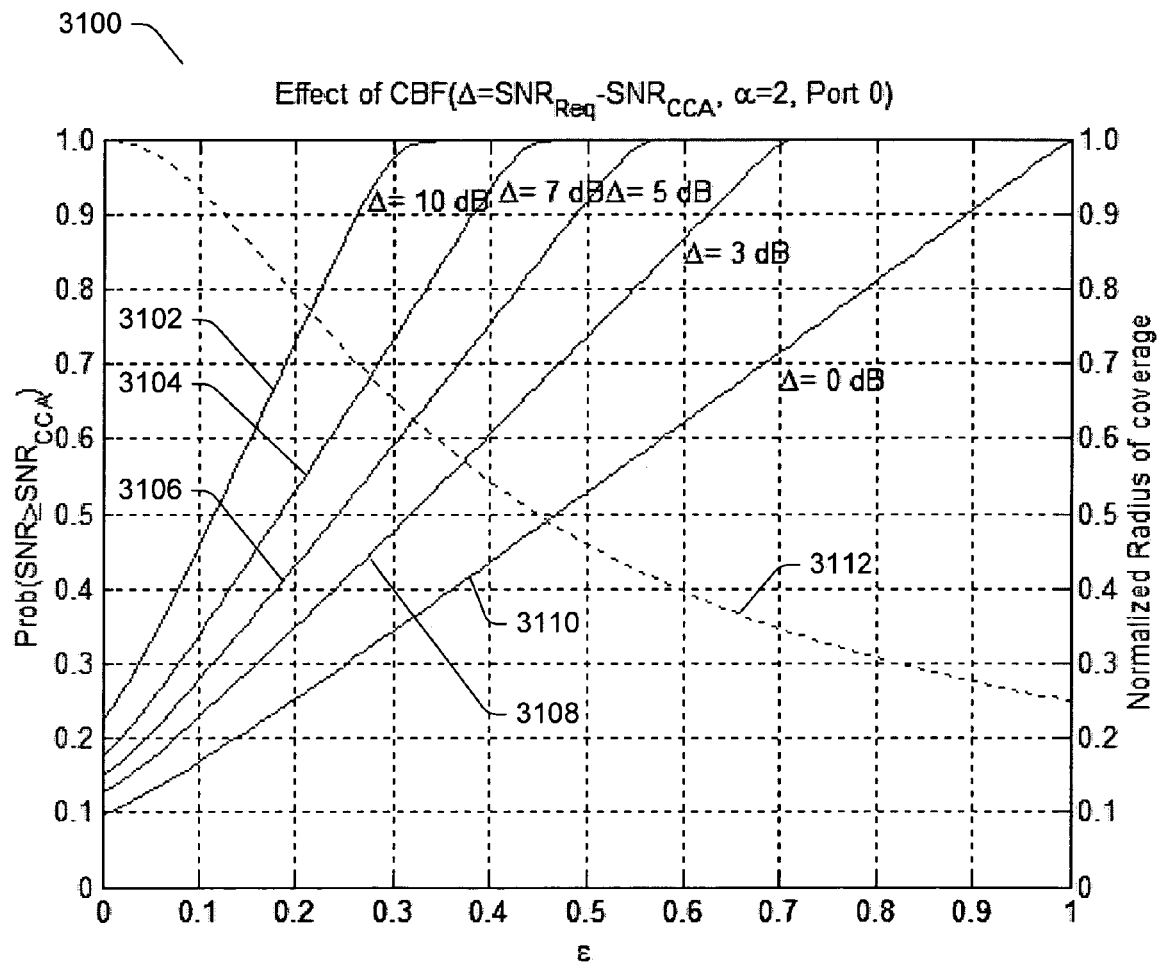
FIGS. 31–32 are graphs depicting certain effects of complementary beamforming in accordance with certain exemplary implementations of the present invention.

In graph 3100 of FIG. 31, the probability is shown on the left vertical axis assuming the users are uniformly distributed over the entire coverage area with path loss exponent equal to 2. On the horizontal axis larger $\epsilon$ values increase the probability. Here, for example, lines 3102, 3104, 3106, 3108, and 3110 show differences ($\Delta$s) of 10 db, 7 dB, 5 dB, 3 dB, and 0 dB, respectively. If the total transmitted power should be a certain level, a larger $\epsilon$ will reduce the radius of the coverage area as shown by line 3112 and the right hand vertical axis. However, when the difference $\Delta$ is larger, a smaller $\epsilon$ will provide the same probability.

Figure 32:
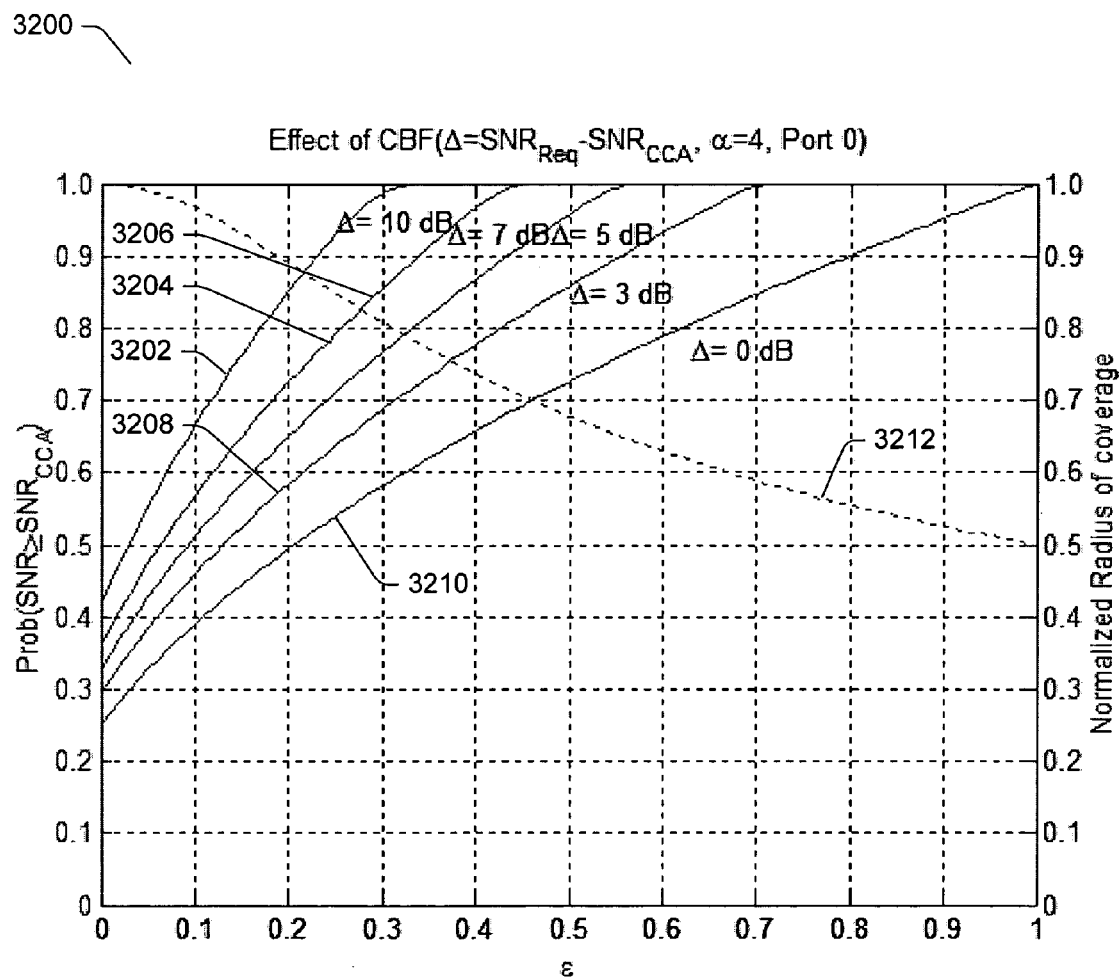

As shown in similar graph 3200 in FIG. 32, when the path loss exponent is equal to 4 there is a higher probability. In multiple downlink beams the power penalty will be small. In graph 3200, lines 3202, 3204, 3206, 3208, and 3210 show differences ($\Delta$s) of 10 db, 7 dB, 5 dB, 3 dB, and 0 dB, respectively; line 3212 shows the radius of the coverage area.

6.4 Extension to Scattering Environment 6.4.1 Non-zero Angular Spread and Zero Delay Spread When multipath components are separated in angles but with approximately the same path delay, the spatial signature of the k-th user can be expressed as $$h_k = \sum_l h_k^l a(\theta_k^l)$$

where $h_k^l$ and $\theta_k^l$ represent the fading gain and DOA of the l-th multipath, respectively.

The received uplink and downlink signal can be modified as follows $$y(t) = Hd(t) + n(t) \quad (22)$$

and $$r(t) = H^T W d(t) + n(t), \quad (23)$$

respectively, where H=[h$_1$ h$_2$ ... h$_K$] and the rank of H is assumed K.

The MMSE combining provides optimum uplink combining among the linear combining techniques and the pseudoinverse downlink beamforming yields infinity SIR at intended user's angle.

It is clear that the complementary beamforming techniques can be applied. For the projection, however, one needs to redefine the subspace and consequently the projection matrix also. The subspace S should be the column space of H*. When the downlink beamforming matrix has the special form W=H*B, Theorems 3 and 4 still hold with W$_a$=⌊W H*⌋. Using the null generation and the null widening techniques one can create additional nulls at the complementary and downlink beam.

6.4.2 Non-Zero Angular and Delay Spread

If multipath arrives at different angles with large delay spread, space-time combining with tapped delay line may be used, for example, as in wideband signal beamformings. See, e.g., Joseph C. Liberti, Jr., and Theodore S. Rappaport, Smart Antennas for Wireless Communications, Prentice Hall, 1999. If the up/downlink signal is an OFDM signal, then the optimum beamforming may, for example, be achieved by space-frequency combining. Since the linear model (22) and (23) hold in the MIMO OFDM signal in frequency domain, one can apply the same rules.

The invention claimed is:

1. A method for use in a wireless communication system, the method comprising:
    outputting at least one signal suitable for causing a smart antenna to transmit at least one complementary beam, said at least one signal being operatively configured to cause said smart antenna to perform single beam complementary beamforming (SBCBF);
    causing said smart antenna to transmit said at least one complementary beam based on said at least one signal; and
    configuring said at least one signal to cause said smart antenna to perform said SBCBF by transmitting energy at a detectable transmit power level in all smart antenna-supported directions while substantially preserving a shape of at least one main transmit beam having a transmit power level that is significantly greater than said detectable transmit power level, said SBCBF being operatively performed by said smart antenna that is operatively associated with a base station within a wireless communication system, said base station including a Butler matrix network configured to form said at least one main beam using said smart antenna, and further configured to provide at least one of post-combining SBCBF or pre-combining SBCBF.

2. The method as recited in claim 1, wherein outputting said at least one signal suitable for causing said smart antenna to transmit at least one complementary beam further includes:
    using a zero-forcing beamformer to output said at least one signal.

3. The method as recited in claim 1, wherein outputting said at least one signal suitable for causing said smart antenna to transmit at least one complementary beam further includes:
    using a maximum SINR beamformer to output said at least one signal.

4. The method as recited in claim 1, wherein outputting said at least one signal suitable for causing said smart antenna to transmit at least one complementary beam further includes:
    outputting said signal based on at least a complementary beamforming matrix at time t given by:

$$S^t = \left[(A^H A)^{-1} A^H \Big/ \sqrt{\mathrm{Tr}((A^H A)^{-1})} + \frac{1}{\sqrt{k}} \varepsilon Z_t \right].$$

5. The method as recited in claim 1, wherein outputting said at least one signal suitable for causing said smart antenna to transmit at least one complementary beam further includes:
    outputting said signal based on at least matrices P$_0$, P$_1$, ..., P$_{m-k}$ having rows, respectively, U$_0^H$, U$_1^H$, ..., U$_{m-k}^H$ and wherein a fixed beamforming matrix is given by:

$$S = \left[(A^H A)^{-1} A^H \Big/ \sqrt{\mathrm{Tr}((A^H A)^{-1})} + \frac{1}{\sqrt{k}} \varepsilon \sum_{i=1}^{m-k} P_i \right].$$

6. A method for use in a wireless communication system, the method comprising:
    outputting at least one signal suitable for causing a smart antenna to transmit at least one complementary beam, said at least one signal being operatively configured to cause said smart antenna to perform subspace complementary beamforming (SCBF), and said at least one signal including N-K data streams operatively configured to cause said smart antenna to transmit energy in at least one side lobe;
    determining said at least one signal by using a Downlink Beamforming Matrix:

$W = U\Lambda V^H$;

determining said at least one signal by using a Steering Matrix:

A=[a(θ$_1$) a(θ$_2$) ... a(θ$_K$)], wherein a(θ$_k$) represents a steering vector of user k;
    and wherein:
    if W=A*B, where B is a non-singular K-by-K matrix, then using a complementary beamforming matrix of $$W^c = \sqrt{\frac{k_0 C_0}{N}} [u_{K+1}\ u_{K+2}\ \cdots u_N]$$

wherein C$_0$=Nc$_0$ is the level of the main lobe, k$_0$ is the scaling factor and u$_l$ is the l-th column vector of U, otherwise using a complementary beamforming matrix of $$W^c = \sqrt{\frac{k_0 C_0}{N}} [\bar{u}_1\ \bar{u}_2\ \cdots \bar{u}_{N-K}]$$

wherein $\bar{u}_l$ is the l-th left singular vector of the matrix $$\left(\sum_{l=K+1}^{N} \tilde{u}_l \tilde{u}_l^H\right) U \Lambda^c = \overline{U \Lambda V}^H,$$

and $A^* = \tilde{U} \tilde{\Lambda} \tilde{V}^H$ is assumed, and in scattering channel $H^* = \tilde{U} \tilde{\Lambda} \tilde{V}^H$ is assumed.

7. The method as recited in claim 6, further comprising: determining said at least one signal by selectively modifying a weight matrix to operatively support said SCBF.

8. The method as recited in claim 6, further comprising: determining said at least one signal by selectively expanding a size of a weight matrix to operatively support said SCBF.

9. The method as recited in claim 6, wherein it is assumed that 2K<N, $$W_a = [W \ A^*] = U_a \Lambda_a V_a^H, \text{ and } W^c = \sqrt{\frac{k_0 C_0}{N}} [u_{a,r+1} \ u_{a,r+2} \ \ldots \ u_{a,N}],$$

and wherein r is rank of $W_a$.

10. A method for use in a wireless communication system, the method comprising:
outputting at least one signal suitable for causing a smart antenna to transmit at least one complementary beam, said at least one signal being operatively configured to cause said smart antenna to perform complementary superposition beamforming (CSBF); and
determining said at least one signal by using a downlink beamforming matrix:
$\tilde{W} = [w_1 \ldots w_{k-1} \ \tilde{w}_k \ w_{k+1} \ldots w_K]$, where $\tilde{w}_k = p_0 w_k + W^c p$ and p is complex conjugate transpose of the l-th row of $W^c$, $$p_0 = \frac{w_{k,l}^*}{|w_{k,l}|}$$

is normalized complex conjugate of the l-th element of $w_k$.

11. The method as recited in claim 10, wherein $W^c$ is associated with subspace complementary beamforming (SCBF).

12. The method as recited in claim 10, further comprising: determining said at least one signal by using $\tilde{W} = [w_1 \ w_2 \ldots w_K \ W^c p]$.

13. The method as recited in claim 10, further comprising: determining said at least one signal by using a null-generation technique that is configured to generate L nulls at angles $\theta_1, \theta_2, \ldots, \theta_L$ at a beam.

14. The method as recited in claim 10, further comprising: determining said at least one signal by using $A = [a(\theta_1) \ a(\theta_2) \ldots a(\theta_L)]$.

15. The method as recited in claim 10, further comprising: determining said at least one signal by projecting w onto orthogonal complement subspace of column space $A^*$.

16. The method as recited in claim 10, further comprising: determining said at least one signal by using a vector: $w = (I - P_S)w$ where $P_S = A^*(A^T A^*)^{-1} A^T$, and in scattering channel $P_S = H^*(H^T H^*)^{-1} H^T$.

17. The method as recited in claim 10, further comprising: determining said at least one signal by using a null-widening technique that is configured to produce at least one null at a vicinity of selected angles.

18. The method as recited in claim 10, further comprising: determining said at least one signal by selectively modifying a steering matrix to:

$\tilde{A} = [\tilde{a}(\theta_1) \ \tilde{a}(\theta_2) \ldots \tilde{a}(\theta_K)]$ wherein $\tilde{a}(\theta_k) = [a(\theta_k - \Delta \theta_l) \ a(\theta_k) \ a(\theta_k + \Delta \theta_r)]$.

19. The method as recited in claim 10, further comprising: determining said at least one signal by establishing at least two nulls such that a rank of A is less than N.

20. The method as recited in claim 10, further comprising: determining said at least one signal by using adaptive control of a complementary beam level.

21. The method as recited in claim 10, further comprising: determining said at least one signal by, in a non-zero angular channel, selectively reducing a complementary beam level.

22. The method as recited in claim 10, further comprising: determining said at least one signal by, for delay spread channels, selectively reducing a complementary beam level.

23. The method as recited in claim 10, further comprising: determining said at least one signal by, in free space, selectively increasing the complementary beam level.

24. A method for use in a wireless communication system, the method comprising:
outputting at least one signal suitable for causing a smart antenna to transmit at least one complementary beam, wherein said outputting includes selectively constructing a plurality of matrices $Z_1, Z_1, \ldots, Z_L$, where L is a length of a downlink transmission period, such that said plurality of matrices satisfy at least one property selected from a group of properties comprising:
(a) for all $1 \leq i \leq L$, a matrix $Z_i$ is a k×m matrix whose rows are in a set $\{0, \pm U_0^H, \pm U_1^H, \ldots, \pm U_{m-k-1}^H\}$;
(b) if L is even, then, $Z_2 = -Z_1, Z_4 = -Z_3, \ldots, Z_L = -Z_{L-1}$;
(c) if L is odd, then $Z_2 = -Z_1, Z_4 = -Z_3, \ldots, Z_{L-1} = -Z_{L-2}, Z_L = 0$; and
(d) each element $+U_0^H, -U_0^H, +U_1^H, -U_1^H, \ldots, +U_{m-k-1}^H, -U_{m-k-1}^H$ appear p times in a list of Lk rows of $Z_1, Z_1, \ldots, Z_L$ for some positive integer p.

25. The method as recited in claim 24, wherein rows of $Z_{2i-1}$ are, respectively, $U_{0 \oplus i}^H, U_{1 \oplus i}^H, \ldots, U_{k-1 \oplus i}^H$ and where $i \oplus j$ denote $(i+j) \mod(m-k)$ for $i = 1, 2, 3, \ldots, [L/2]$ and wherein $Z_{2i} = -Z_{2i-1}$.

26. The method as recited in claim 24, further comprising: using as a beamforming matrix:

$$S^t = \left[ (A^H A)^{-1} A^H \Big/ \sqrt{\text{Tr}((A^H A)^{-1})} + \frac{1}{\sqrt{k}} \varepsilon Z_i \right]$$

where $\varepsilon \geq 0$ is a fixed positive number.

27. The method as recited in claim 26, wherein said complementary beam is configured to cause a loss of at most $10 \log_{10}(1 + |\varepsilon|^2)$ in a received signal for an intended recipient.

28. The method as recited in claim 26, wherein said complementary beam is configured to direct a portion:

$$|\varepsilon|^2 \frac{\sum_{j=1}^{m}|b_j|^2}{m}$$

of a resulting transmitted power to another recipient whose spatial signature is $B=(b_1, b_2, \ldots, b_m)$.

29. An apparatus for use in a wireless communication system, the apparatus comprising:
a smart antenna operatively coupled to receive at least one signal and configured to transmit at least one complementary beam based on said at least one signal; and
circuitry configured to output said at least one signal suitable for causing the smart antenna to transmit said at least one complementary beam, said at least one signal being operatively configured to cause said smart antenna to perform single beam complementary beamforming (SBCBF), said at least one signal being configured by said circuitry to cause said smart antenna to perform said SBCBF by transmitting energy at a detectable transmit power level in all smart antenna-supported directions while substantially preserving a shape of at least one main transmit beam having a transmit power level that is significantly greater than said detectable transmit power level, said smart antenna being operatively associated with a base station within the wireless communication system, said base station including at least a portion of said circuitry which includes a Butler matrix network configured to form said at least one main beam using said smart antenna, and said Butler matrix network being configured to provide at least one of post-combining SBCBF or pre-combining SBCBF.

30. The apparatus as recited in claim 29, wherein said circuitry employs a zero-forcing beamformer to output said at least one signal.

31. The apparatus as recited in claim 29, wherein said circuitry employs a maximum SINR beamformer to output said at least one signal.

32. The apparatus as recited in claim 29, wherein said circuitry is configured to output said signal based on at least a complementary beamforming matrix at time t given by:

$$S^t = \left[ (A^H A)^{-1} A^H \Big/ \sqrt{Tr((A^H A)^{-1})} + \frac{1}{\sqrt{k}} \varepsilon Z_t \right].$$

33. The apparatus as recited in claim 29, wherein said circuitry is configured to output said signal based on at least matrices $P_0, P_1, \ldots, P_{m-k}$ having rows, respectively, $U_0^H, U_1^H, \ldots, U_{m-k}^H$ and wherein a fixed beamforming matrix that is used is given by:

$$S = \left[ (A^H A)^{-1} A^H \Big/ \sqrt{Tr((A^H A)^{-1})} + \frac{1}{\sqrt{k}} \varepsilon \sum_{i=1}^{m-k} P_i \right].$$

34. An apparatus for use in a wireless communication system, the apparatus comprising:
circuitry configured to output at least one signal suitable for causing a smart antenna to transmit at least one complementary beam, said at least one signal being operatively configured to cause said smart antenna to perform subspace complementary beamforming (SCBF), and said at least one signal including N−K data streams operatively configured to cause said smart antenna to transmit energy in at least one side lobe; wherein:
said circuitry is configured to determine said at least one signal by using a Downlink Beamforming Matrix: $W = U\Lambda V^H$;
said circuitry is configured to determine said at least one signal by using a Steering Matrix: $A = [a(\theta_1)\ a(\theta_2) \ldots a(\theta_K)]$, wherein $a(\theta_k)$ represents a steering vector of user k; and wherein:
if $W = A*B$, where B is a non-singular K-by-K matrix, then said circuitry is configured to use a complementary beamforming matrix of $$W^c = \sqrt{\frac{k_0 C_0}{N}} [u_{K+1}\ u_{K+2}\ \ldots\ u_N]$$

wherein $C_0 = Nc_0$ is the level of the main lobe, $k_0$ is the scaling factor and $u_l$ is the l-th column vector of U,
otherwise said circuitry is configured to use a complementary beamforming matrix of $$W^c = \sqrt{\frac{k_0 C_0}{N}} [\bar{u}_1\ \bar{u}_2\ \ldots\ \bar{u}_{N-K}]$$

wherein $\bar{u}_l$ is the l-th left singular vector of the matrix $$\left( \sum_{l=K+1}^{N} \tilde{u}_l \tilde{u}_l^H \right) U \Lambda^c = \overline{U \Lambda V^H},$$

and $A^* = \tilde{U}\tilde{\Lambda}\tilde{V}^H$ is assumed, and in scattering channel $H^* = \tilde{U}\tilde{\Lambda}\tilde{V}^H$ is assumed.

35. The apparatus as recited in claim 34, wherein said circuitry is configured to determine said at least one signal by selectively modifying a weight matrix to operatively support said SCBF.

36. The apparatus as recited in claim 34, wherein said circuitry is configured to determine said at least one signal by selectively expanding a size of a weight matrix to operatively support said SCBF.

37. The apparatus as recited in claim 36, wherein said circuitry is configured such that 2K<N, $$W_a = \lfloor W\ A^* \rfloor = U_a \Lambda_a V_a^H, \text{ and}$$

$$W^c = \sqrt{\frac{k_0 C_0}{N}} [u_{a,r+1}\ u_{a,r+2}\ \cdots\ u_{a,N}],$$

and wherein r is rank of $W_a$.

38. An apparatus for use in a wireless communication system, the apparatus comprising:
circuitry configured to output at least one signal suitable for causing a smart antenna to transmit at least one complementary beam, said circuitry being configured such that said at least one signal causes said smart antenna to perform complementary superposition beamforming (CSBF); and wherein said circuitry is configured to determine said at least one signal by using a downlink beamforming matrix: $\tilde{W}=[w_1 \ldots w_{k-1}\ \tilde{w}_k\ w_{k+1} \ldots w_K]$, where $\tilde{w}_k = p_0 w_k + W^c p$ and p is complex conjugate transpose of the l-th row of $W^c$, $$p_0 = \frac{w_{k,l}^*}{|w_{k,l}|}$$

is normalized complex conjugate of the l-th element of $w_k$.

39. The apparatus as recited in claim 38, wherein $W^c$ is associated with subspace complementary beamforming (SCBF).

40. The apparatus as recited in claim 38, wherein said circuitry is configured to determine said at least one signal by using $\tilde{W}=[w_1\ w_2 \ldots w_K\ W^c p]$.

41. The apparatus as recited in claim 38, wherein said circuitry is configured to determine said at least one signal by using a null-generation technique that is configured to generate L nulls at angles $\theta_1, \theta_2, \ldots, \theta_L$ at a beam.

42. The apparatus as recited in claim 38, wherein said circuitry is configured to determine said at least one signal by using $A=[a(\theta_1)\ a(\theta_2) \ldots a(\theta_L)]$.

43. The apparatus as recited in claim 38, wherein said circuitry is configured to determine said at least one signal by projecting w onto orthogonal complement subspace of column space $A^*$.

44. The apparatus as recited in claim 38, wherein said circuitry is configured to determine said at least one signal by using a vector: $w=(I-P_S)w$ where $P_S=A^*(A^T A^*)^{-1}A^T$, and in scattering channel $P_S=H^*(H^T H^*)^{-1}H^T$.

45. The apparatus as recited in claim 38, wherein said circuitry is configured to determine said at least one signal by using a null-widening technique that is configured to produce at least one null at a vicinity of selected angles.

46. The apparatus as recited in claim 38, wherein said circuitry is configured to determine said at least one signal by selectively modifying a steering matrix to:

$$\tilde{A}=[\tilde{a}(\theta_1)\ \tilde{a}(\theta_2) \ldots \tilde{a}(\theta_K)]$$

wherein $\tilde{a}(\theta_k)=[a(\theta_k-\Delta\theta_l)\ a(\theta_k)\ a(\theta_k+\Delta\theta_r)]$.

47. The apparatus as recited in claim 38, wherein said circuitry is configured to determine said at least one signal by establishing at least two nulls such that a rank of A is less than N.

48. The apparatus as recited in claim 38, wherein said circuitry is configured to determine said at least one signal by using adaptive control of a complementary beam level.

49. The apparatus as recited in claim 38, wherein said circuitry is configured to determine said at least one signal by, in a non-zero angular channel, selectively reducing a complementary beam level.

50. The apparatus as recited in claim 38, wherein said circuitry is configured to determine said at least one signal by, for delay spread channels, selectively reducing a complementary beam level.

51. The apparatus as recited in claim 38, wherein said circuitry is configured to determine said at least one signal by, in free space, selectively increasing the complementary beam level.

52. An apparatus for use in a wireless communication system, the apparatus comprising:
 circuitry configured to output at least one signal suitable for causing a smart antenna to transmit at least one complementary beam, said circuitry being configured to construct a plurality of matrices $Z_1, Z_1, \ldots, Z_L$, where L is a length of a downlink transmission period, such that said plurality of matrices satisfy at least one property selected from a group of properties comprising:
 (a) for all $1 \leq i \leq L$, a matrix $Z_i$ is a k×m matrix whose rows are in a set $\{0, \pm U_0^H, \pm U_1^H, \ldots, \pm U_{m-k-1}^H\}$;
 (b) if L is even, then, $Z_2=-Z_1, Z_4=-Z_3, \ldots, Z_L=-Z_{L-1}$;
 (c) if L is odd, then $Z_2=-Z_1, Z_4=-Z_3, \ldots, Z_{L-1}=-Z_{L-2}$, $Z_L=0$; and
 (d) each element $+U_0^H, -U_0^H, +U_1^H, -U_1^H, \ldots, +U_{m-k-1}^H, -U_{m-k-1}^H$ appear p times in a list of Lk rows of $Z_1, Z_1, \ldots, Z_L$ for some positive integer p.

53. The apparatus as recited in claim 52, wherein rows of $Z_{2i-1}$ are, respectively, $U_{0 \oplus i}^H, U_{1 \oplus i}^H, \ldots, U_{k-1 \oplus i}^H$ and where $i \oplus j$ denote $(i+j) \bmod (m-k)$ for $i=1, 2, 3, \ldots, [L/2]$ and wherein $Z_{2i}=-Z_{2i-1}$.

54. The apparatus as recited in claim 52, wherein said circuitry is configured to construct a beamforming matrix:

$$S^i = \left[ (A^H A)^{-1} A^H / \sqrt{Tr((A^H A)^{-1})} + \frac{1}{\sqrt{k}} \varepsilon Z_i \right]$$

where $\varepsilon \geq 0$ is a fixed positive number.

55. The apparatus as recited in claim 54, wherein said complementary beam is configured to cause a loss of at most $10 \log_{10}(1+|\varepsilon|^2)$ in a received signal for an intended recipient.

56. The apparatus as recited in claim 54, wherein said complementary beam is configured to direct a portion:

$$|\varepsilon|^2 \frac{\sum_{j=1}^{m} |b_j|^2}{m}$$

of a resulting transmitted power to another recipient whose spatial signature is $B=(b_1, b_2, \ldots, b_m)$.

* * * * *